(12) United States Patent
Chen et al.

(10) Patent No.: US 8,150,365 B2
(45) Date of Patent: Apr. 3, 2012

(54) BASE STATION, SUBORDINATE STATION, AND EMERGENCY INFORMATION TRANSMISSION METHOD THEREOF

(75) Inventors: Chiu-Wen Chen, Taipei (TW); Chun-Yen Hsu, Minxiong Township (TW)

(73) Assignee: Institue for Information Industry, Taipei (TW)

( * ) Notice: Subject to any disclaimer, the term of this patent is extended or adjusted under 35 U.S.C. 154(b) by 123 days.

(21) Appl. No.: 12/826,370

(22) Filed: Jun. 29, 2010

(65) Prior Publication Data
US 2010/0330951 A1 Dec. 30, 2010

Related U.S. Application Data

(60) Provisional application No. 61/221,102, filed on Jun. 29, 2009, provisional application No. 61/221,561, filed on Jun. 30, 2009.

(51) Int. Cl.
*H04M 11/04* (2006.01)

(52) U.S. Cl. ............... 455/404.1; 455/574; 370/311; 370/338

(58) Field of Classification Search ................ None
See application file for complete search history.

(56) References Cited

U.S. PATENT DOCUMENTS

| 7,483,519 | B2 * | 1/2009 | Binning .................... 379/45 |
| 2007/0032219 | A1 * | 2/2007 | Rudolf et al. ............. 455/404.1 |
| 2009/0186594 | A1 * | 7/2009 | Kang et al. ............... 455/404.1 |
| 2009/0264126 | A1 * | 10/2009 | Khetawat et al. ........ 455/435.1 |
| 2010/0107192 | A1 * | 4/2010 | Sennett et al. ............. 725/33 |
| 2011/0274012 | A1 * | 11/2011 | Jang et al. ................. 370/259 |

* cited by examiner

*Primary Examiner* — Ajit Patel
(74) *Attorney, Agent, or Firm* — Skaar Ulbrich Macari, P.A.

(57) ABSTRACT

A base station (BS), a subordinate station (SS) and emergency information transmission methods thereof are provided. The SS is in a power-saving state. The BS shall allocate an emergency alert indicator and emergency information in a transmission channel. The SS in the power-saving state receives the emergency information according to the emergency alert indicator and proceeds with a handshake protocol with the BS to establish an emergency service flow between the BS and the SS.

40 Claims, 39 Drawing Sheets

BASE STATION, SUBORDINATE STATION, AND EMERGENCY INFORMATION TRANSMISSION METHOD THEREOF

PRIORITY

This application claims priority to U.S. provisional application No. 61/221,102, filed on Jun. 29, 2009, and U.S. provisional application No. 61/221,561, filed on Jun. 30, 2009, both of which are hereby incorporated by reference herein.

FIELD

The present invention relates to a base station (BS), a subordinate station (SS) and emergency information transmission methods thereof. More particularly, the present invention relates to a BS, an SS and emergency information transmission methods thereof that are capable of establishing an emergency service flow according to an emergency alert indicator.

BACKGROUND

Owing to advancement of wireless communication technologies, a wide variety of wireless signal transmission devices such as mobile phones, personal digital assistants (PDAs), notebook computers and the like have found wide application in people's daily life. Correspondingly, network services that can be realized through the wireless signal transmission devices also become increasingly diversified. For example, people now can download music pieces and enjoy online movies both in a real-time manner via the wireless signal transmission devices. These network services not only provide people with more convenient network applications, but also dramatically increase the added value of the wireless signal transmission devices.

From the perspective of a base station (BS), all the wireless signal transmission devices described above may be viewed as subordinate stations (SSs). In order to improve the power utilization efficiency of an SS, the SS will enter a power-saving state when no network service is needed, so as to effectively extend the battery life. Furthermore, when an emergency condition occurs, the BS will transmit emergency information to the SS to notify the user of the SS. However, in case the SS is in the power-saving state, it will fail to receive the emergency information, so the BS must retransmit the emergency information to the SS when the SS resumes the active state, thus leading to unnecessary waste of network resources.

Accordingly, an need exists in the art to provide a solution that enables an SS that is in a power-saving state to successfully receive emergency information from a BS and to perform corresponding actions according to the emergency information, so as to improve the utilization efficiency of network resources.

SUMMARY

An objective of certain embodiments of the present invention is to provide a BS for transmitting emergency information. The BS is adapted for use in a wireless network and is adapted to be used in conjunction with a backhaul network and an SS that is in a power-saving state. The backhaul network is configured to generate the emergency information. The BS comprises a communication interface and a processor electrically connected to the communication interface.

The communication interface is configured to receive the emergency information. The processor is configured to, in response to reception of the emergency information, generate an emergency alert indicator that indicates existence of the emergency information and allocate that the emergency information and the emergency alert indicator are to be transmitted via a broadcast/multicast channel. The communication interface is further configured to transmit a preamble and a superframe header via the broadcast/multicast channel so that the SS in the power-saving state can obtain the emergency information according to the emergency alert indicator. The SS is further configured to perform corresponding actions in response to the emergency information.

Another objective of certain embodiments of the present invention is to provide an emergency information transmission method for a BS. The BS is adapted for use in a wireless network and is adapted to be used in conjunction with a backhaul network and an SS that is in a power-saving state. The backhaul network is configured to generate emergency information. The BS comprises a communication interface and a processor electrically connected to the communication interface.

The emergency information transmission method comprises the following steps of: (A) enabling the communication interface to receive the emergency information; (B) enabling the processor to, in response to reception of the emergency information, generate an emergency alert indicator that indicates existence of the emergency information; (C) enabling the processor to allocate the emergency information and the emergency alert indicator that are to be transmitted via a broadcast/multicast channel; and (D) enabling the communication interface to transmit the emergency information and the emergency alert indicator via the broadcast/multicast channel so that the SS in the power-saving state can obtain the emergency information according to the emergency alert indicator. The SS is further configured to perform corresponding actions in response to the emergency information.

Yet another objective of certain embodiments of the present invention is to provide an SS for receiving the emergency information. The SS is adapted to be used in conjunction with a BS of a wireless network. The BS is configured to transmit an emergency alert indicator and the emergency information via a broadcast/multicast channel. The emergency alert indicator is configured to indicate existence of the emergency information. The SS is in a power-saving state and comprises a communication interface and a processor electrically connected to the communication interface.

The communication interface is configured to receive the emergency alert indicator and the emergency information via the broadcast/multicast channel in the power-saving state. The processor is configured to learn about existence of the emergency information from the emergency alert indicator and, according to the emergency information, execute a handshake protocol with the BS via the communication interface to establish an emergency service flow.

Yet a further objective of certain embodiments of the present invention is to provide an emergency information transmission method for an SS. The SS is adapted to be used in conjunction with a BS of a wireless network. The BS is configured to transmit an emergency alert indicator and the emergency information via a broadcast/multicast channel. The emergency alert indicator is configured to indicate existence of the emergency information. The SS is in a power-saving state and comprises a communication interface and a processor electrically connected to the communication interface.

The emergency information transmission method comprises the following steps of: (A) enabling the communication interface to receive the emergency alert indicator and the emergency information via the broadcast/multicast channel in the power-saving state; (B) enabling the processor to learn about existence of the emergency information from the emergency alert indicator; and (C) enabling the processor to, according to the emergency information, execute a handshake protocol with the BS via the communication interface to establish an emergency service flow.

According to the above descriptions, the present invention allocates an emergency alert indicator into a data section, which can not only be decoded by an SS that is in an active state, but can also be decoded by an SS that is in a power-saving state. By decoding the data section to obtain the emergency alert indicator, the SS learns that there is emergency information it needs to receive, and then performs corresponding actions according to the emergency information. Thus, the present invention can effectively improve the utilization efficiency of network resources, thereby overcoming the shortcomings of the prior art.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the present invention will be explained with reference to example embodiments thereof; however, these embodiments are not intended to limit the present invention to any specific environment, embodiment, example, applications, or particular implementations described herein. Therefore, descriptions of these example embodiments are only provided for purpose of illustration but not to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
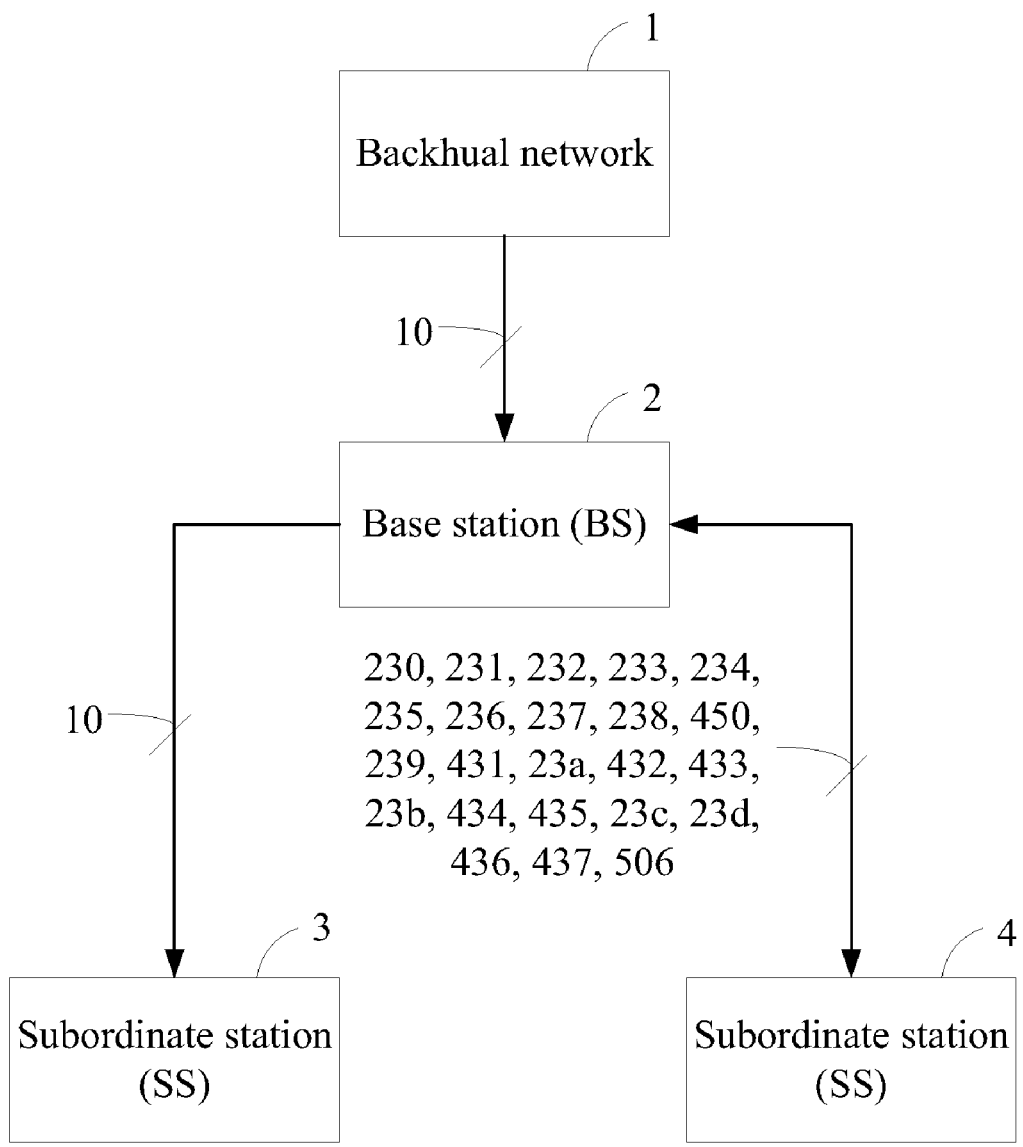
FIG. 1 is a schematic view of a first embodiment of the present invention.

A first embodiment of the present invention is shown in FIG. 1, which is a schematic view of a wireless network system. As can be seen from FIG. 1, the wireless network system comprises a backhaul network 1, a BS 2, an SS 3 in an active state, and an SS 4 in a power-saving state. The backhaul network 1 is adapted to generate and transmit emergency information 10 to the BS 2 in response to occurrence of an emergency condition. After receiving the emergency information 10, in order to allow the SS 3 and the SS 4 to receive the emergency information 10, the BS 2 will transmit the emergency information 10 in a way to be described later so that the SS 3 and the SS 4 can make subsequent processing according to the emergency information 10.

In this embodiment, the wireless network system conforms to a WiMAX wireless network standard; however, in other embodiments, the wireless network system may also be implemented on basis of other wireless communication standards, for example, the $3^{rd}$-generation Long Term Evolution (3G-LTE) wireless communication standard. The technical means by which the backhaul network 1 generates the emergency information 10 is already known in the prior art, and thus will not be further described herein. Additionally, each of the SSs in this embodiment may be a mobile station; and in other embodiments, there may be a different number of SSs 4, and this is not intended to limit the present invention.

Figure 2:
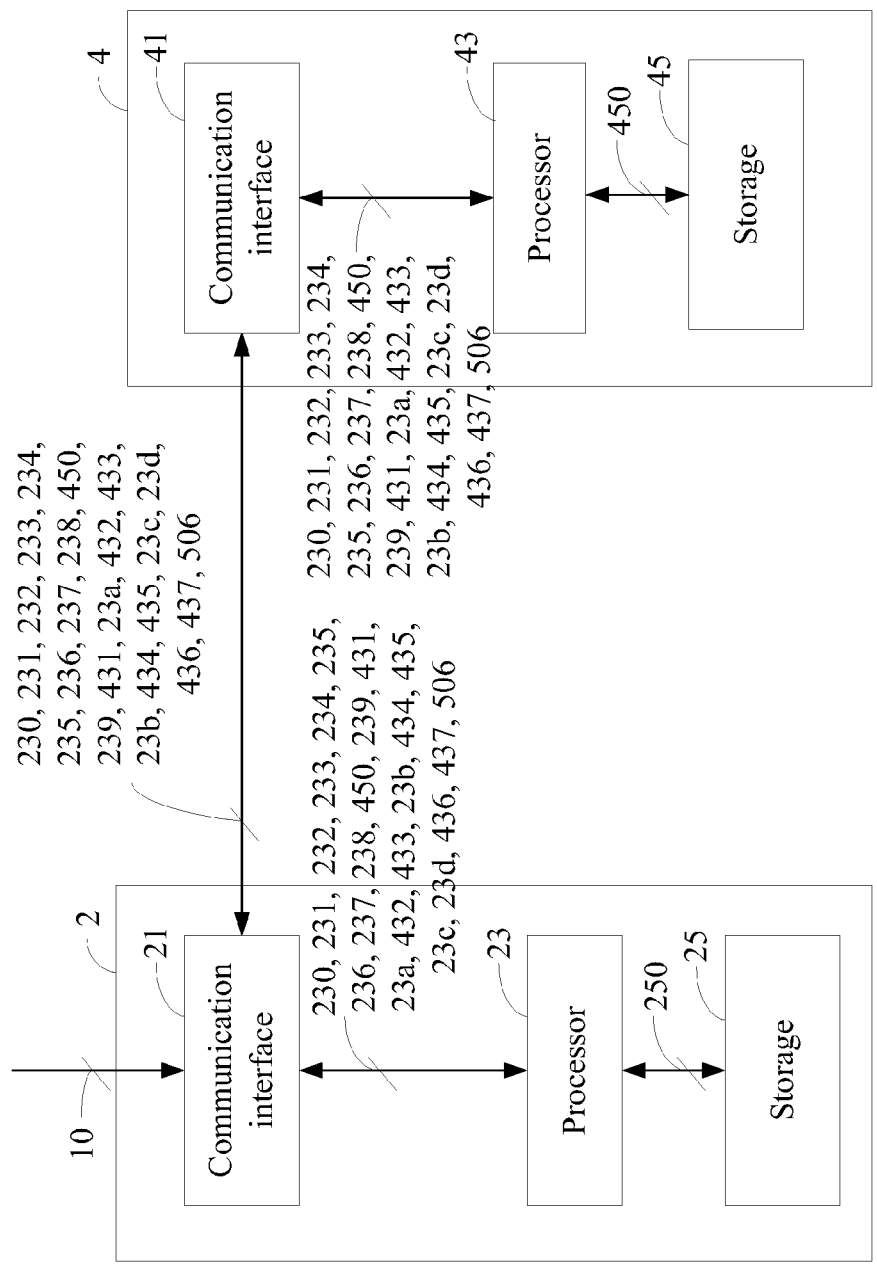
FIG. 2 is a schematic view of a BS and an SS according to the first embodiment.

For purpose of simplicity, how the BS 2 transmits the emergency information 10 to an SS 4 in a power-saving state will be described as an example. Referring to FIG. 2, a schematic view of the BS 2 and the SS 4 is shown therein. As can be seen from FIG. 2, the BS 2 comprises a communication interface 21, a processor 23 and a storage 25. The processor 23 is electrically connected to the communication interface 21 and the storage 25, and the storage 25 has pre-defined resource allocation information 250 stored therein. The SS 4 comprises a communication interface 41, a processor 43 and a storage 45. The processor 43 is electrically connected to the communication interface 41 and the storage 45, and the storage 45 has a pre-defined emergency preamble 450 stored therein. Hereinbelow, functions of the individual elements comprised in the BS 2 and the SS 4 will be described.

After the emergency information 10 is generated by the backhaul network 1, the communication interface 21 of the BS 2 receives the emergency information 10. After receiving the emergency information 10, the BS 2 learns that an emergency condition occurs and it has to transmit the emergency information 10 to the SS 4 through broadcast or multicast. To allow the SS 4 in the power-saving state to receive the emergency information 10 successfully, the processor 23 of the BS 2 will generate an emergency alert indicator 60 in response to reception of the emergency information 10, and allocate the emergency alert indicator 60 into a preamble 230 of a broadcast/multicast channel and allocate the emergency information 10 into a superframe header 231 of the broadcast/multicast channel.

Figure 3A:
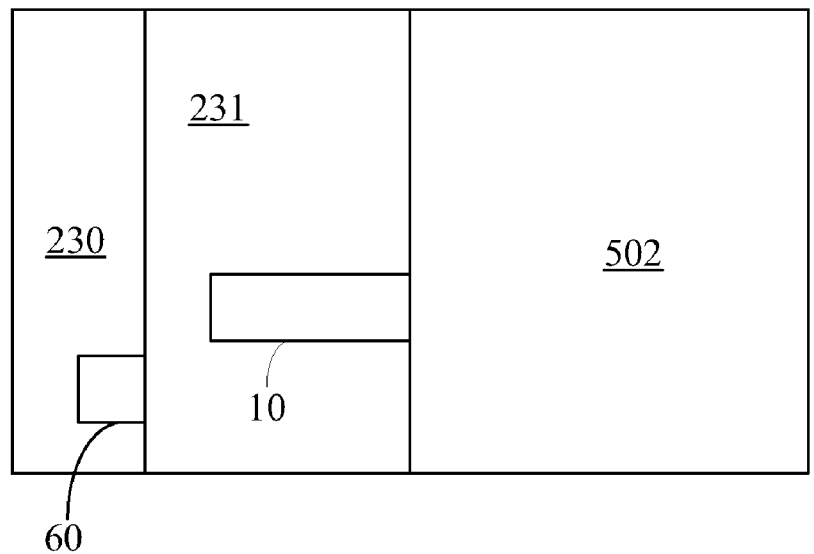
FIGS. 3A-3K are schematic views illustrating frame allocations according to the first embodiment.

To illustrate such an allocation more clearly, please refer to FIG. 3A, which is a schematic view of a frame allocation. The frame comprises a preamble 230, a superframe header 231 and a data section 502. The emergency alert indicator 60 is allocated into the preamble 230, and the emergency information 10 is allocated into the superframe header 231. After receiving the preamble 230 and the superframe header 231, the SS 4 decodes the preamble 230 to obtain the emergency alert indicator 60 and learns from the emergency alert indicator 60 that it needs to decode the superframe header 231. Next, the SS 4 further decodes the superframe header 231 to obtain the emergency information 10.

To be more specific, after the emergency alert indicator 60 and the emergency information 10 have been allocated, the communication interface 21 of the BS 2 transmits the preamble 230 and the superframe header 231 to the SS 4 via the broadcast/multicast channel so that the communication interface 41 of the SS 4 in the power-saving state can receive the preamble 230 and the superframe header 231 in the power-saving state. Afterwards, the processor 43 of the SS 4 decodes the preamble 230 to obtain the emergency alert indicator 60, and learns from the emergency alert indicator 60 that it needs to decode the superframe header 231. Further, the processor 43 of the SS 4 decodes the superframe header 231 according to the emergency alert indicator 60 to obtain the emergency information 10, and according to the emergency information 10, execute a handshake protocol with the BS 2 via the communication interface 41 to establish an emergency service flow.

Besides the aforesaid allocation, the processor 23 of the BS 2 may further allocate the emergency alert indicator 60 and the emergency information 10 in the ways shown in FIG. 3B to FIG. 3K so that the SS 4 can obtain the emergency information 10 successfully. Each of the ways will be described respectively hereinbelow.

Figure 3B:
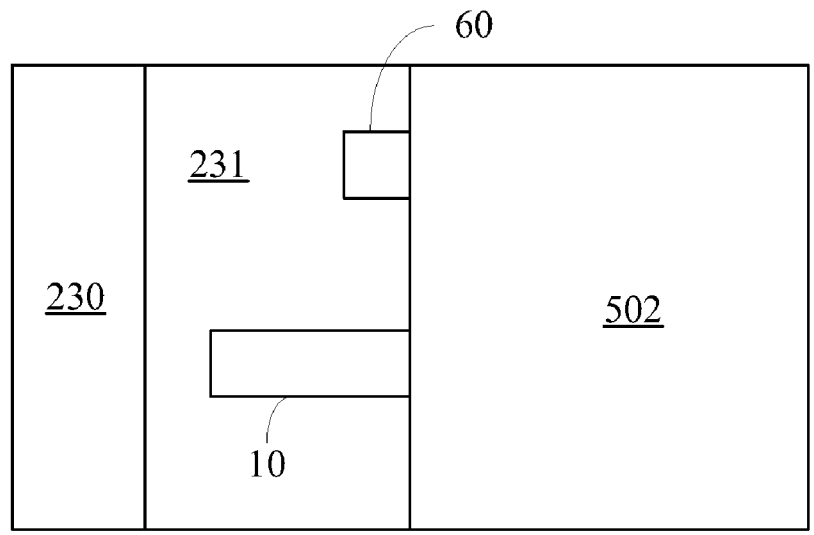

Referring to FIG. 3B, a schematic view of another frame allocation is shown therein. Because a superframe header 231 may consist of a plurality of subpackets, the superframe header 231 in this embodiment at least comprises a first subpacket and a second subpacket. The processor 23 of the BS 2 allocates the emergency alert indicator 60 into the first subpacket and allocates the emergency information 10 into the second subpacket. After the emergency alert indicator 60 and the emergency information 10 have been allocated, the communication interface 21 of the BS 2 transmits the first subpacket and the second subpacket via the broadcast/multicast channel.

The communication interface 41 of the SS 4 in the power-saving state can receive the first subpacket and the second subpacket via the broadcast/multicast channel. Then, the processor 43 of the SS 4 decodes the first subpacket to obtain the emergency alert indicator 60 and learns from the emergency alert indicator 60 that it needs to decode the second subpacket. Next, the processor 43 of the SS 4 further decodes the second subpacket according to the emergency alert indicator 60 to obtain the emergency information 10, and according to the emergency information 10, executes a handshake protocol with the BS 2 via the communication interface 41 to establish an emergency service flow.

Figure 3C:
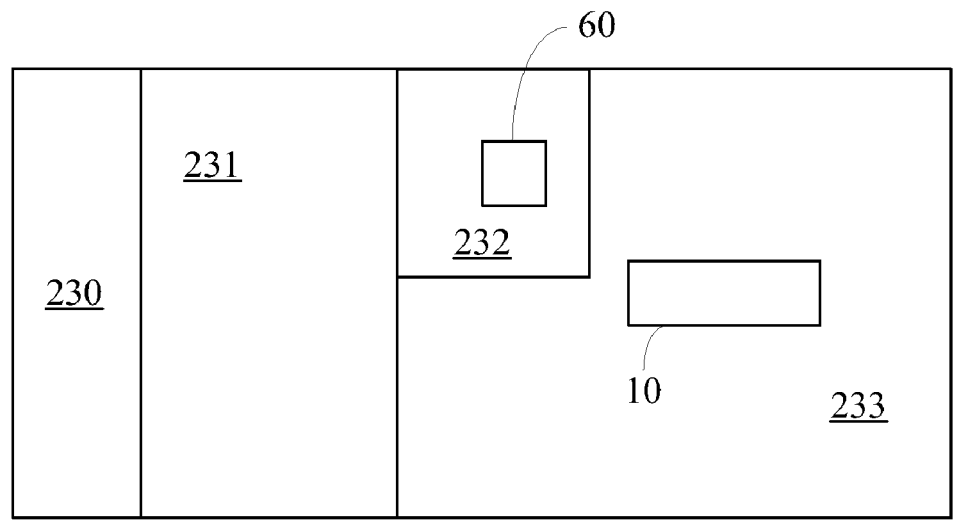

Referring to FIG. 3C, a schematic view of another frame allocation is shown therein. When the SS 4 is in an available interval of the power-saving state, the processor 23 of the BS 2 allocates the emergency alert indicator 60 into a downlink MAP 232 of the broadcast/multicast channel and allocates the emergency information 10 into an MAC management message 233. After the emergency alert indicator 60 and the emergency information 10 have been allocated, the communication interface 21 of the BS 2 further transmits the downlink MAP 232 and the MAC management message 233 via the broadcast/multicast channel.

The communication interface 41 of the SS 4 in the available interval of the power-saving state can receive the downlink MAP 232 and the MAC management message 233 via the broadcast/multicast channel. Then, the processor 43 of the SS 4 decodes the downlink MAP 232 to obtain the emergency alert indicator 60, and from the emergency alert indicator 60, learns a resource allocation of a block where the MAC management message 233 is allocated and also learns that it needs to decode the MAC management message 233. Next, the processor 43 of the SS 4 further decodes the MAC management message 233 according to the emergency alert indicator 60 to obtain the emergency information 10, and according to the emergency information 10, executes a handshake protocol with the BS 2 via the communication interface 41 to establish an emergency service flow. In this embodiment, the emergency alert indicator 60 may be an information element of the downlink MAP 232 and the MAC management message 233 may be an AAI_L2-XFER message, although they are not merely limited thereto.

Figure 3D:
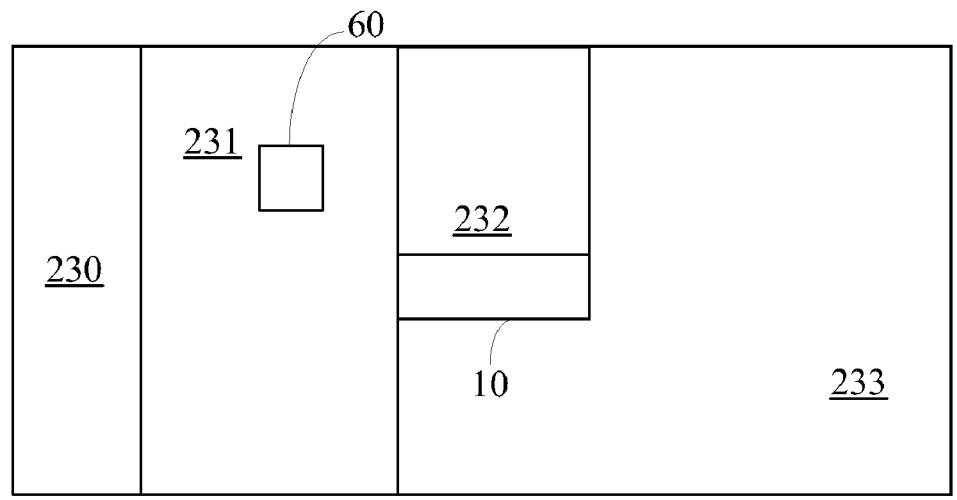

Referring to FIG. 3D, a schematic view of another frame allocation is shown therein. When the SS 4 is in the power-saving state, the processor 23 of the BS 2 can allocate the emergency alert indicator 60 into the first subpacket of the superframe header 231, and allocate the emergency information 10 into an MAC management message 233. Then, the communication interface 21 further transmits the first subpacket and the MAC management message 233 via the broadcast/multicast channel.

The communication interface 41 of the SS 4 in the power-saving state can receive the first subpacket and the MAC management message 233 via the broadcast/multicast channel. Then, the processor 43 of the SS 4 decodes the first subpacket to obtain the emergency alert indicator 60, and learns from the emergency alert indicator 60 that it needs to decode the MAC management message 233. Next, the processor 43 of the SS 4 further decodes the MAC management message 233 according to the emergency alert indicator 60 to obtain the emergency information 10, and according to the emergency information 10, executes a handshake protocol with the BS 2 via the communication interface 41 to establish an emergency service flow.

Figure 3E:
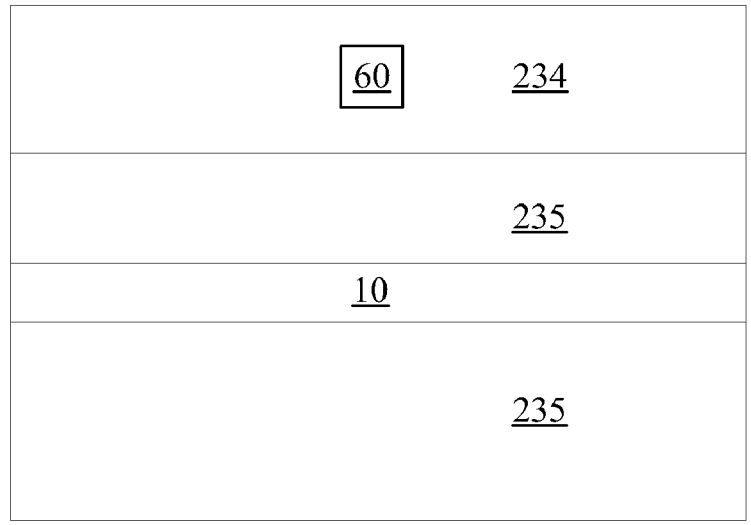

Referring to FIG. 3E, a schematic view of another frame allocation is shown therein. When the SS 4 is in an available interval of the power-saving state, the processor 23 of the BS 2 allocates the emergency alert indicator 60 into a broadcast/multicast service MAP (MBS MAP) 234 and allocates the emergency information 10 into a broadcast/multicast service message 235. After the emergency alert indicator 60 and the emergency information 10 have been allocated, the communication interface 21 of the BS 2 further transmits the broadcast/multicast service MAP 234 and the broadcast/multicast service message 235 via the broadcast/multicast channel.

The communication interface 41 of the SS 4 in the available interval of the power-saving state can receive the broadcast/multicast service MAP 234 and the broadcast/multicast service message 235 via the broadcast/multicast channel. Then, the processor 43 of the SS 4 decodes the broadcast/multicast service MAP 234 to obtain the emergency alert indicator 60, and learns from the emergency alert indicator 60 that it needs to decode the broadcast/multicast service message 235. Next, the processor 43 of the SS 4 further decodes the broadcast/multicast service message 235 according to the emergency alert indicator 60 to obtain the emergency information 10, and according to the emergency information 10, executes a handshake protocol with the BS via the communication interface 41 to establish the emergency service flow. In this embodiment, the emergency alert indicator 60 may be an information element of the broadcast/multicast service MAP 234, although it is not merely limited thereto.

Figure 3F:
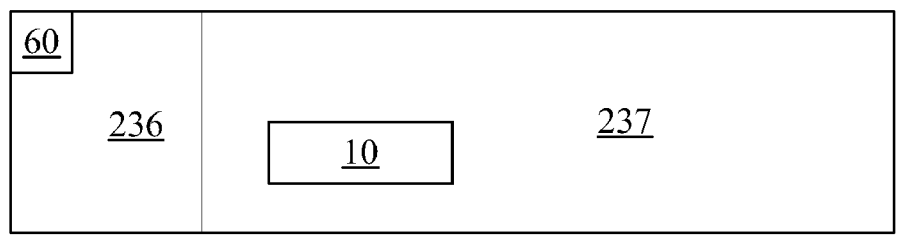
Figure 3G:
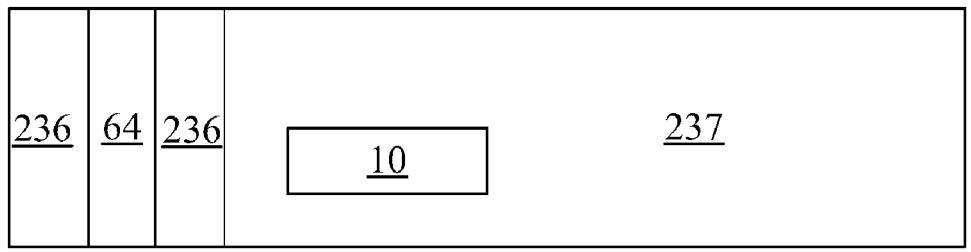

Referring to FIG. 3F, a schematic view of another frame allocation is shown therein. When the SS 4 is in an available interval of the power-saving state, the processor 23 of the BS 2 allocates the emergency alert indicator 60 into a downlink MAP 236 of a paging channel, and allocates the emergency information 10 into an indication message 237. After the emergency alert indicator 60 and the emergency information 10 have been allocated, the communication interface 21 of the BS 2 further transmits the downlink MAP 236 and the indication message 237 via the paging channel.

The communication interface 41 of the SS 4 in the available interval of the power-saving state can receive the downlink MAP 236 and the indication message 237 via the paging channel. Then, the processor 43 of the SS 4 decodes the downlink MAP 236 to obtain the emergency alert indicator 60, and learns from the emergency alert indicator 60 that it needs to decode the indication message 237. Next, the processor 43 of the SS 4 further decodes the indication message 237 according to the emergency alert indicator 60 to obtain the emergency information 10, and according to the emergency information 10, executes a handshake protocol with the BS 2 via the communication interface 41 to establish an emergency service flow. In this embodiment, the emergency alert indicator 60 may be an information element of the downlink MAP 236, although it is not merely limited thereto. Additionally, referring to FIG. 3G, FIG. 3G differs from FIG. 3F mainly in that the emergency alert indicator 60 is an emergency alert paging identification 64, so what identical to FIG. 3F will not be further described herein.

Figure 3H:
Figure 3H:
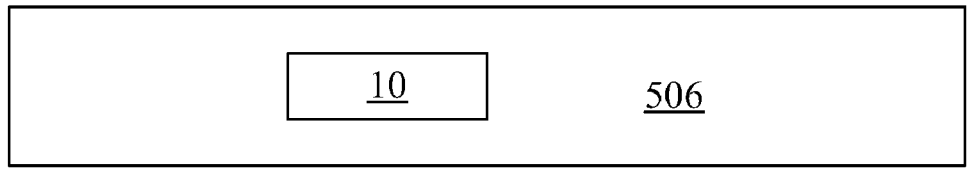
Figure 3I:
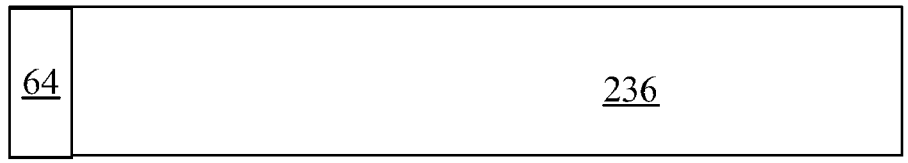
Figure 3I:
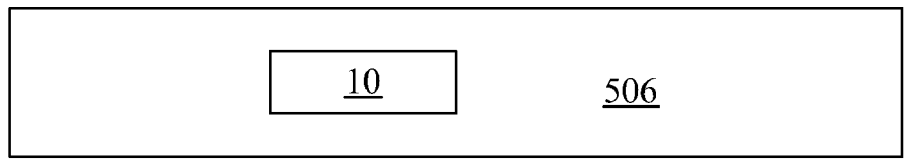

Referring next to FIG. 3H, a schematic view of another frame allocation is shown therein. When the SS 4 is in an available interval of the power-saving state, the processor 23 of the BS 2 allocates the emergency alert indicator 60 into the downlink MAP 236 of the paging channel, and allocates the emergency information 10 into a broadcast message 506 of a broadcast channel. After the emergency alert indicator 60 and the emergency information 10 have been allocated, the communication interface 21 of the BS 2 further transmits the downlink MAP 236 via the paging channel and transmits the broadcast message 506 via the broadcast channel.

The communication interface 41 of the SS 4 in the available interval of the power-saving state can receive the downlink MAP 236 via the paging channel. Then, the processor 43 of the SS 4 decodes the downlink MAP 236 to obtain the emergency alert indicator 60, and learns that it needs to receive the emergency information 10 from the broadcast message 506 of the broadcast channel. The communication interface 41 of the SS 4 further receives the emergency information 10 from the broadcast message 506 of the broadcast channel according to the emergency alert indicator 60. According to the emergency information 10, the SS 4 executes a handshake protocol with the BS 2 via the communication interface 41 to establish an emergency service flow. In this embodiment, the emergency alert indicator 60 may be an information element of the downlink MAP 236, although it is not merely limited thereto. Additionally, referring to FIG. 3I, FIG. 3I differs from FIG. 3H mainly in that the emergency alert indicator 60 is an emergency alert paging identification 64, so what identical to FIG. 3H will not be further described herein.

Figure 3J:
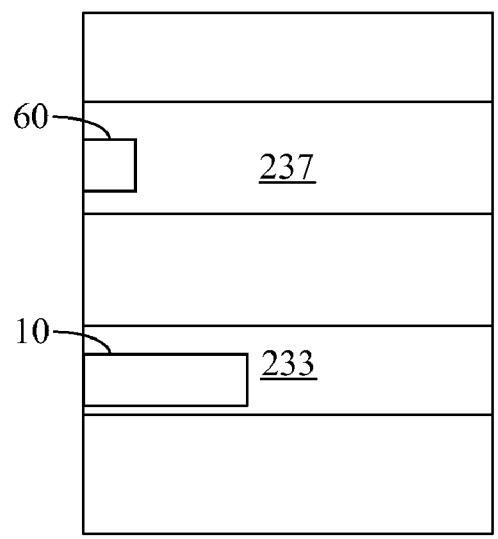

Referring to FIG. 3J, a schematic view of another frame allocation is shown therein. When the SS 4 is in an available interval of the power-saving state, the processor 23 of the BS 2 allocates the emergency alert indicator 60 into an indication message 237 of a downlink subframe, and allocates the emergency information 10 into an MAC management message 233 of the same downlink subframe. After the emergency alert indicator 60 and the emergency information 10 have been allocated, the communication interface 21 of the BS 2 transmits the indication message 237 and the MAC management message 233. It shall be appreciated that, in other embodiments, the emergency alert indicator 60 and the emergency information 10 may also be allocated into an indication message and an MAC management message of different downlink subframes respectively.

The communication interface 41 of the SS 4 in the available interval of the power-saving state can receive the indication message 237 and the MAC management message 233 via the downlink subframe. Then, the processor 43 of the SS 4 decodes the indication message 237 to obtain the emergency alert indicator 60, and learns from the emergency alert indicator 60 that it needs to further decode the MAC management message 233 to obtain the emergency information 10. The SS 4 will, according to the emergency information 10, execute a handshake protocol with the BS 2 via the communication interface 41 to establish an emergency service flow. In this embodiment, the MAC management message 233 may be an AAI_L2-XFER message and the emergency alert indicator 60 may be an indicator with one bit or an emergency alert paging identification, although they are not merely limited thereto.

Figure 3K:
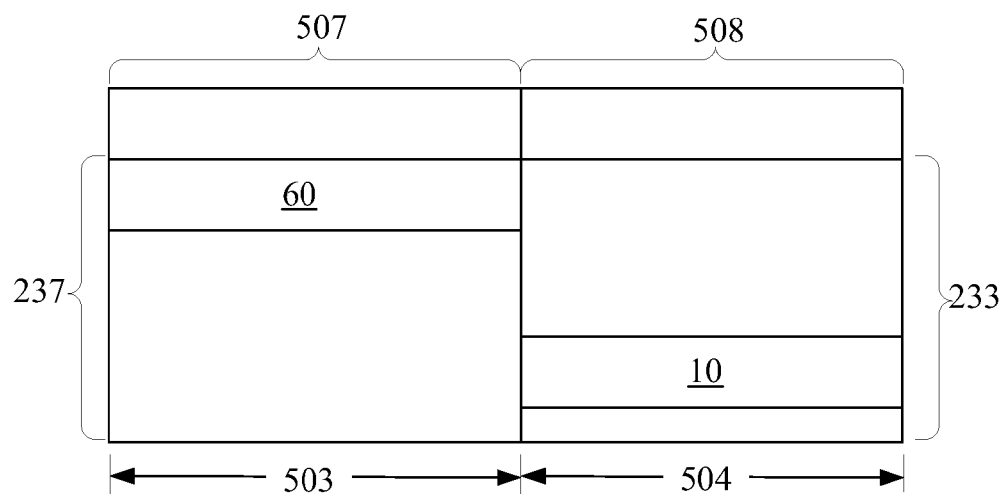

Referring to FIG. 3K, a schematic view of another frame allocation is shown therein. When the SS 4 is in an available interval 503 of the power-saving state, the processor 23 of the BS 2 allocates the emergency alert indicator 60 into an indication message 237 of a downlink subframe 507, and allocates the emergency information 10 into an MAC management message 233 of another downlink subframe 508 in an unavailable interval 504. After the emergency alert indicator 60 and the emergency information 10 have been allocated, the communication interface 21 of the BS 2 transmits the indication message 237 and the MAC management message 233.

The communication interface 41 of the SS 4 in an available interval 503 of the power-saving state can receive the indication message 237. Then, the processor 43 of the SS 4 decodes the indication message 237 to obtain the emergency alert indicator 60, and learns from the emergency alert indicator 60 that it needs to receive the MAC management message 233 of the downlink subframe 508 in the unavailable interval 504. Next, the communication interface 41 receives the MAC management message 233 of the downlink subframe 508 in the unavailable interval 504. After the MAC management message 233 is received, the processor 43 of the SS 4 further decodes the MAC management message 233 to obtain the emergency information 10. The SS 4 will, according to the emergency information 10, execute a handshake protocol with the BS 2 via the communication interface 41 to establish an emergency service flow. In this embodiment, the MAC management message 233 may be an AAI_L2-XFER message and the emergency alert indicator 60 may be an indicator with one bit or an emergency alert paging identification, although they are not merely limited thereto.

More specifically, if the SS 4 is in an idle mode of the power-saving state, then each of the aforesaid indication messages may be a paging message; and if the SS 4 is in a sleep mode of the power-saving state, then each of the aforesaid indication messages may be a traffic-indication message, although the present invention is not limited thereto.

Now, how the SS 4 executes the handshake protocol with the BS 2 to establish the emergency service flow will be described. Generally speaking, the SS 4 will execute different handshake protocols depending on whether it has been registered with the BS 2. Hereinbelow, a case in which the SS 4 has not been registered with the BS 2 will be described at first.

When the SS 4 has not been registered with the BS 2, the SS 4 needs to be registered with the BS 2 while it is executing a handshake protocol with the BS 2. Therefore, the predefined emergency preamble 450 stored in the storage 45 comprises an emergency service notification and an authentication notification so that the registration and the establishment of the emergency service flow can be carried out simultaneously.

Figure 4:
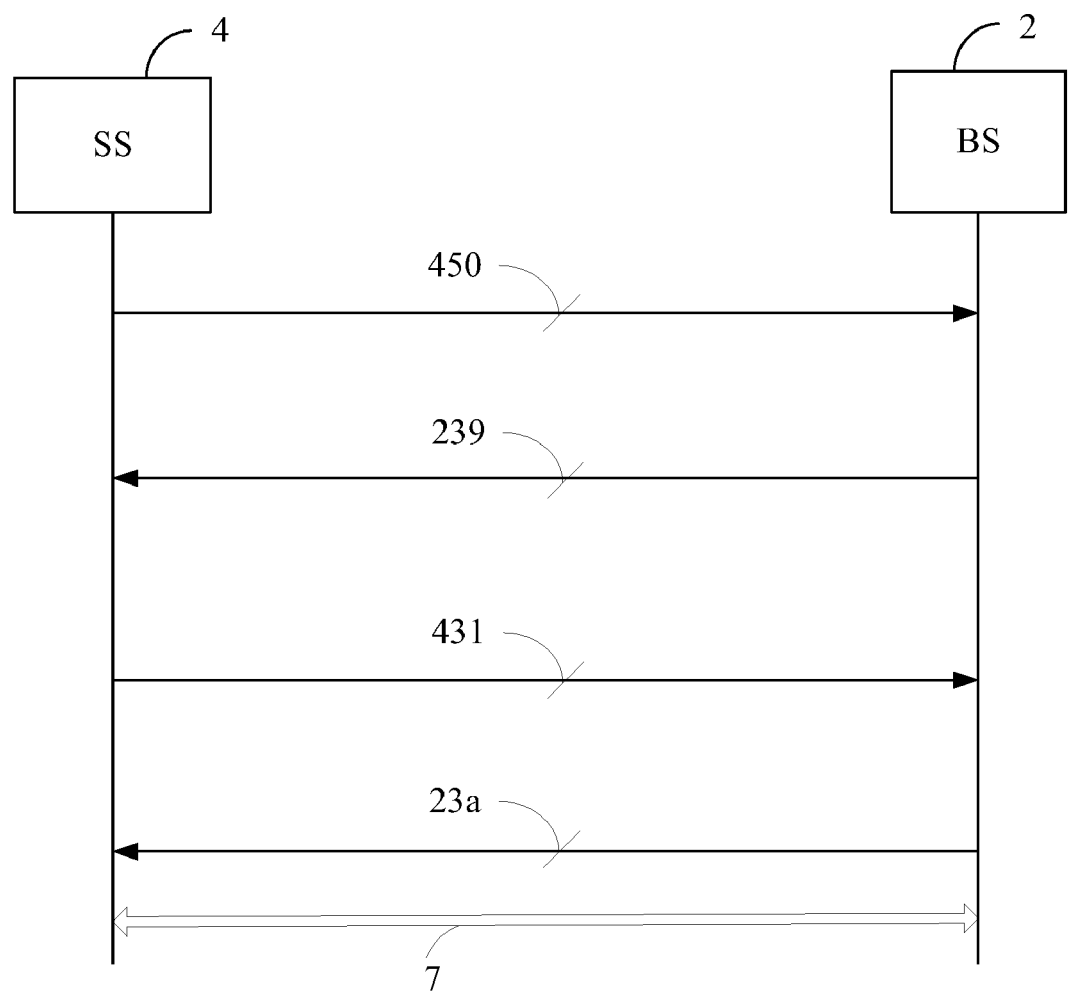
FIGS. 4-8 are schematic views illustrating processes of establishing an emergency service flow according to the first embodiment.

In more detail, referring to FIG. 4, a schematic view of a process of establishing an emergency service flow is shown therein. After obtaining the emergency information 10, the processor 43 of the SS 4 transmits the predefined emergency preamble 450 to the BS 2 via the communication interface 41 according to the emergency information 10. Then, the processor 23 of the BS 2 receives the predefined emergency preamble 450 via the communication interface 21 and, according to the authentication notification of the predefined emergency preamble 450, agrees to the registration and the emergency service requested by the SS 4. Next, according to the emergency service notification of the predefined emergency preamble 450 and the predefined resource allocation information 250, the processor 23 of the BS 2 allocates an emergency service resource to the SS 4 so that the SS 4 can obtain sufficient network resources to establish the emergency service flow. After the emergency service resource has been allocated, the processor 23 of the BS 2 transmits an uplink agreement signal 239 to the SS 4 via the communication interface 21.

The processor 43 of the SS 4 receives the uplink agreement signal 239 via the communication interface 41, and according to the uplink agreement signal 239, transmits a systematized request message 431 to the BS 2 via the communication interface 41. Then, the processor 23 of the BS 2 receives the systematized request message 431 via the communication interface 21, and according to the systematized request message 431, transmits a systematized response message 23a via the communication interface 21. The processor 43 of the SS 4 then receives the systematized response message 23a via the communication interface 41, and performs an emergency service flow setup 7 with the BS 2 to complete the registration procedure and the handshake protocol of the emergency service flow. It shall be appreciated that, the emergency service flow setup 7 may be accomplished by a conventional technology, so it will not be further described herein.

Figure 5:
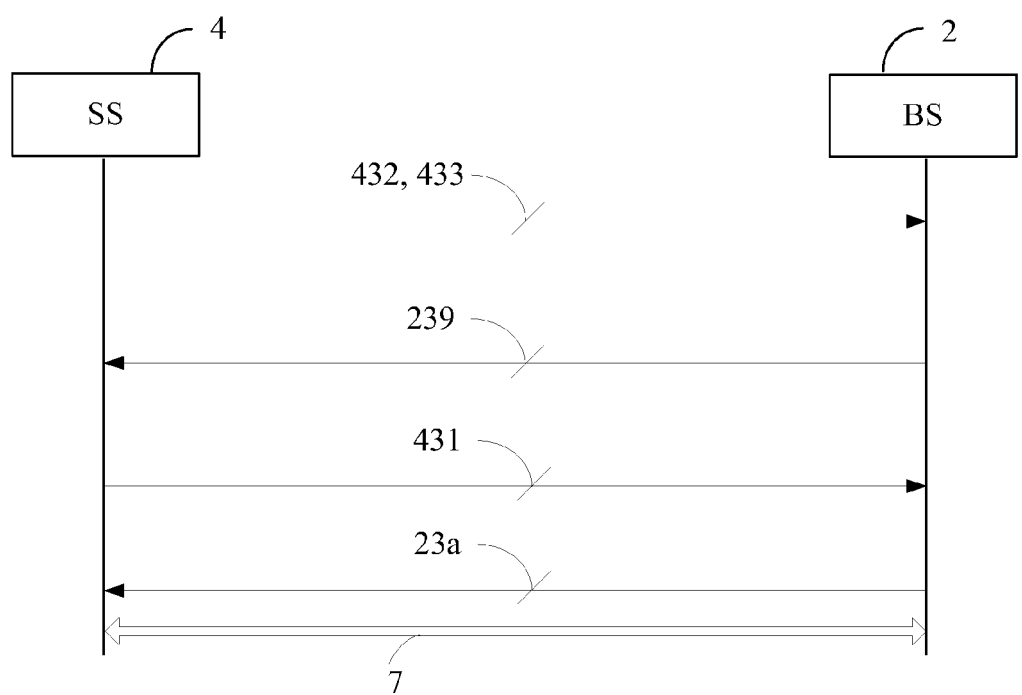

Besides the way described above, the SS 4 that has not be registered with the BS 2 may also accomplish the registration and the establishment of the emergency service flow simultaneously in the following way. Referring to FIG. 5, a schematic view of a process of establishing an emergency service flow is shown therein. After obtaining the emergency information 10, the processor 43 of the SS 4 transmits an initialized system preamble 432 and a quick access message 433 comprising an emergency service notification to the BS 2 via the communication interface 41 according to the emergency information 10. Then, the processor 23 of the BS 2 receives the initialized system preamble 432 and the quick access message 433 via the communication interface 21 and decodes the quick access message 433 to obtain the emergency service notification.

Next, according to the initialized system preamble 432 and the emergency service notification, the processor 23 of the BS 2 allocates a network resource to the SS 4 so that the SS 4 can obtain sufficient network resources to establish the emergency service flow. Furthermore, after the network resource has been allocated, the processor 23 of the BS 2 generates an uplink agreement signal 239 and transmits the uplink agreement signal 239 to the SS 4 via the communication interface 21. Then, the processor 43 of the SS 4 receives the uplink agreement signal 239 via the communication interface 41 and, according to the uplink agreement signal 239, transmits a systematized request message 431 to the BS 2 via the communication interface 41. The processor 23 of the BS 2 then receives the systematized request message 431 via the communication interface 21 and, according to the systematized request message 431, transmits a systematized response message 23a via the communication interface 21. The processor 43 of the SS 4 receives the systematized response message 23a via the communication interface 41, and performs an emergency service flow setup 7 with the BS 2 to complete the registration procedure and the handshake protocol of the emergency service flow. It shall be appreciated that, the emergency service flow setup 7 may be accomplished by a conventional technology, so it will not be further described herein.

Figure 6:
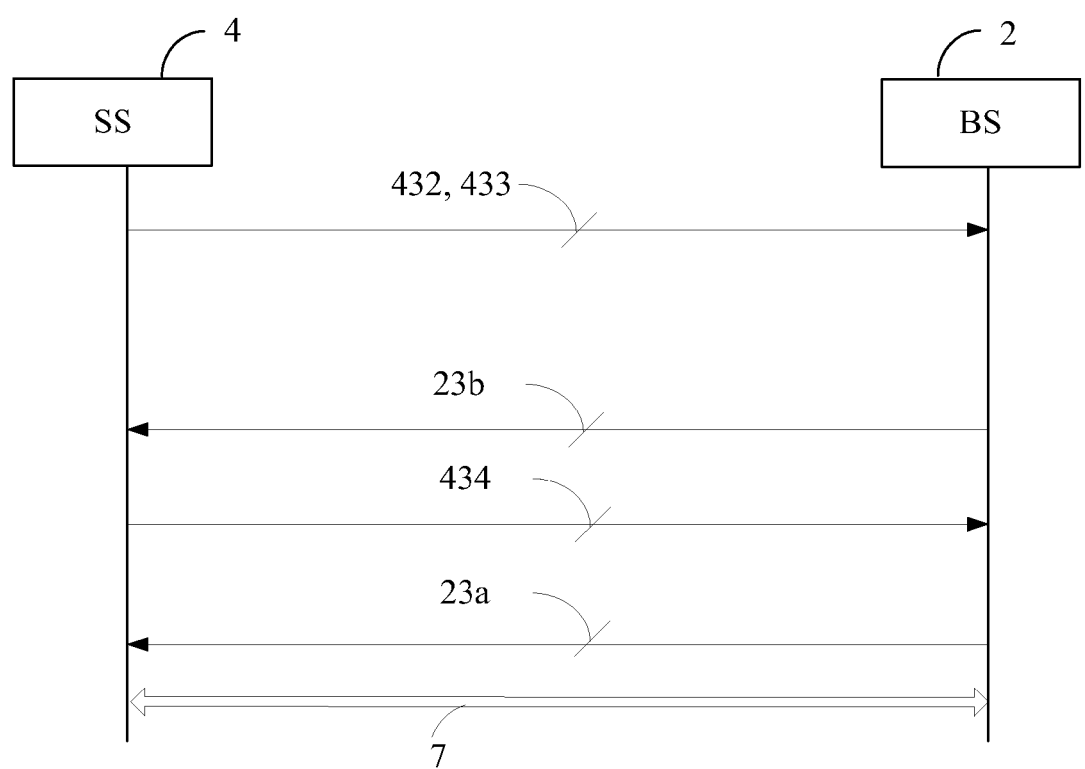

On the other hand, referring to FIG. 6, a schematic view of a process of establishing an emergency service flow is shown therein. If the processor 23 of the BS 2 determines that the quick access message 433 is not decoded successfully, it will generate a determination result and, according to the determination result and the initialized system preamble 432, further generate a systematized acknowledgement (ACK) signal 23b, which is then transmitted by the processor 23 of the BS 2 to the SS 4 via the communication interface 21. The processor 43 of the SS 4 receives the systematized ACK signal 23b via the communication interface 41, and after receiving the systematized ACK signal 23b, transmits a systematized request message 434 comprising the emergency service notification to the BS 2 via the communication interface 41.

The processor 23 of the BS 2 receives the systematized request message 434 comprising the emergency service notification via the communication interface 21, and according to the emergency service notification of the systematized request message 434, allocates a network resource to the SS 4. After the network resource has been allocated, the processor 23 of the BS 2 transmits a systematized response message 23a to the SS 4 via the communication interface 21. Then, the processor 43 of the SS 4 receives the systematized response message 23a via the communication interface 41, and performs an emergency service flow setup 7 with the BS 2 to complete the registration procedure and the handshake protocol of the emergency service flow.

Figure 7:
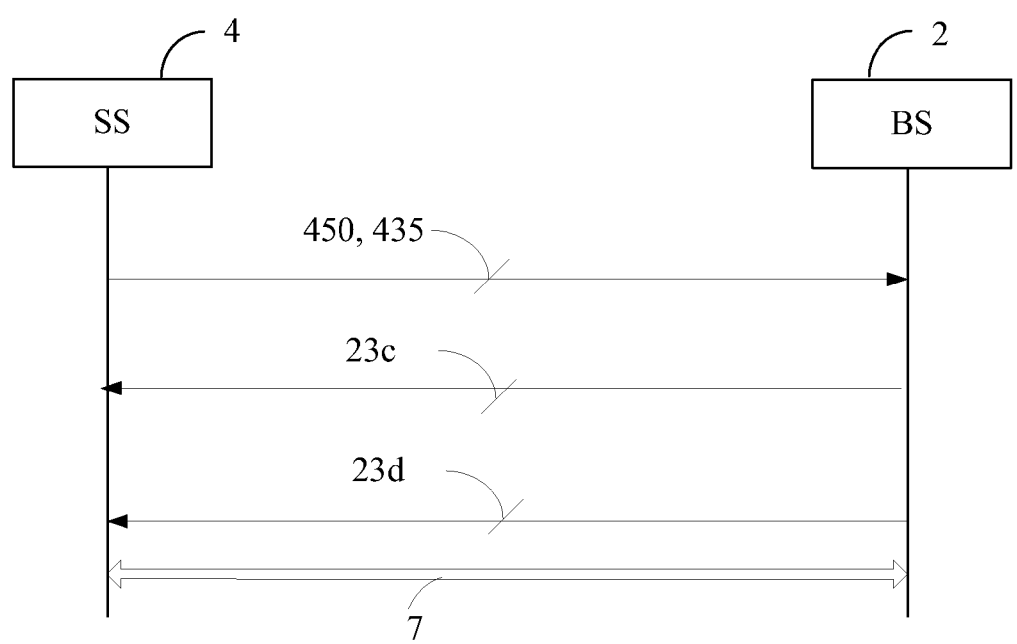

Next, how the SS 4 establishes an emergency service flow when it has been registered with the BS 2 will be described. Referring to FIG. 7, a schematic view of a process of establishing an emergency service flow is shown therein. After obtaining the emergency information 10, the processor 43 of the SS 4 transmits a quick access message 435 and a predefined emergency preamble 450 comprising an emergency service notification to the BS 2 via the communication interface 41 according to the emergency information 10. Then, the processor 23 of the BS 2 receives the predefined emergency preamble 450 and the quick access message 435 via the communication interface 21 and, according to the quick access message 435, the emergency service notification and the predefined resource allocation information 250, allocates an emergency service resource to the SS 4 so that the SS 4 can obtain sufficient network resources to establish the emergency service flow. After the emergency service resource has been allocated, the processor 23 of the BS 2 transmits an uplink agreement signal 23d and a bandwidth request ACK signal 23c to the SS 4 via the communication interface 21. It shall be appreciated that, the uplink agreement signal 23d and the bandwidth request ACK signal 23c may also be incorporated into a single signal for transmission to the SS 4, and the present invention has no limitation on this.

The processor 43 of the SS 4 receives the uplink agreement signal 23d and the bandwidth request ACK signal 23c via the communication interface 41, and performs an emergency service flow setup 7 with the BS 2 to complete the handshake protocol of the emergency service flow. It shall be appreciated that, the emergency service flow setup 7 may be accomplished by a conventional technology, so it will not be further described herein.

Figure 8:
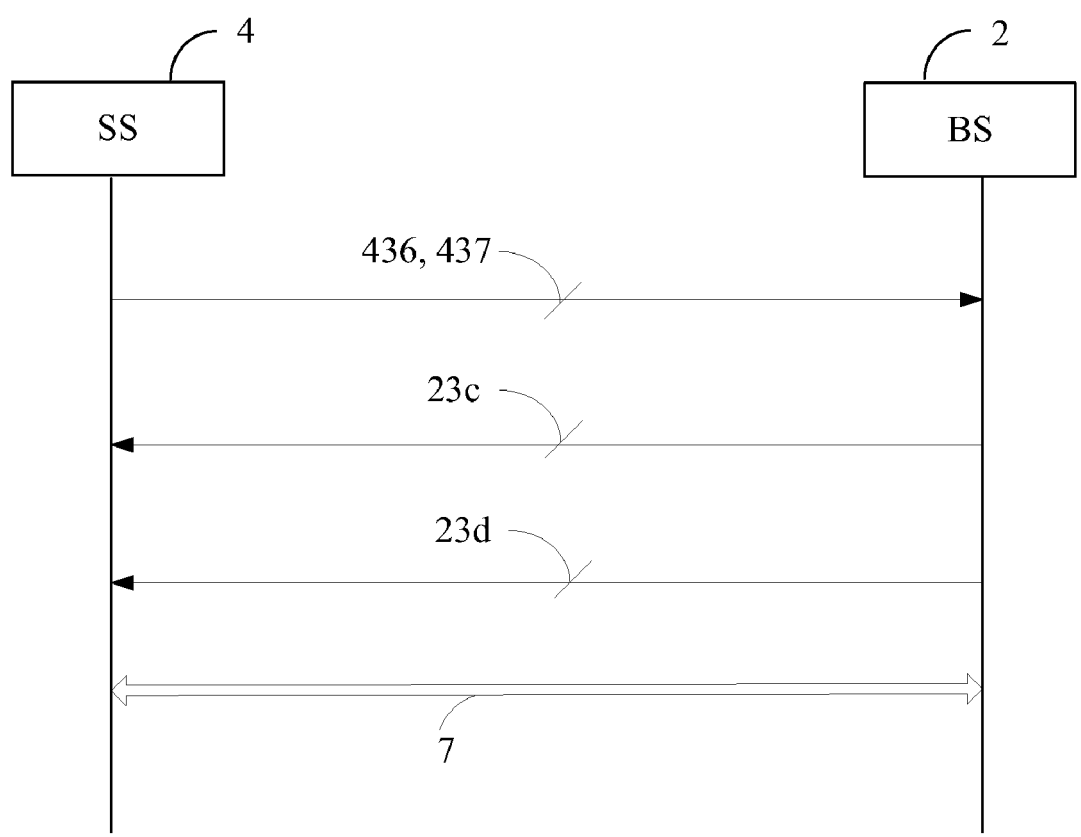

Besides the way described above, the SS 4 that has been registered with the BS 2 may also accomplish the establishment of the emergency service flow in the following way. Referring to FIG. 8, a schematic view of a process of establishing an emergency service flow is shown therein. After obtaining the emergency information 10, the processor 43 of the SS 4 transmits a bandwidth request preamble 437 and a quick access message 436 comprising an emergency service notification to the BS 2 via the communication interface 41 according to the emergency information 10. Then, the processor 23 of the BS 2 receives the bandwidth request preamble 437 and the quick access message 436 via the communication interface 21 and decodes the quick access message 436 to obtain the emergency service notification.

Next, according to the bandwidth request preamble 437 and the emergency service notification, the processor 23 of the BS 2 allocates a network resource to the SS 4 so that the SS 4 can obtain sufficient network resources to establish the emergency service flow. Furthermore, after the network resource has been allocated, the processor 23 of the BS 2 generates a bandwidth request ACK signal 23c corresponding to the bandwidth request preamble 437 and an uplink agreement signal 23d corresponding to the quick access message 436, and transmits the bandwidth request ACK signal 23c and the uplink agreement signal 23d to the SS 4 via the communication interface 21. Then, the processor 43 of the SS 4 receives the bandwidth request ACK signal 23c and the uplink agreement signal 23d via the communication interface 41, and performs an emergency service flow setup 7 with the BS 2 to complete the handshake protocol of the emergency service flow. It shall be appreciated that, the uplink agreement signal 23d and the bandwidth request ACK signal 23c may also be incorporated into a single signal for transmission to the SS 4, and the present invention has no limitation on this.

Apart from being applicable to this embodiment, the aforesaid way of accomplishing the handshake protocol of the emergency service flow may further be applicable to a case in which the SS needs to establish an emergency service flow with the BS in response to occurrence of an emergency, and the present invention is not limited to that the handshake protocol of the emergency service flow disclosed above can be used only when emergency information is received.

Figure 9A:
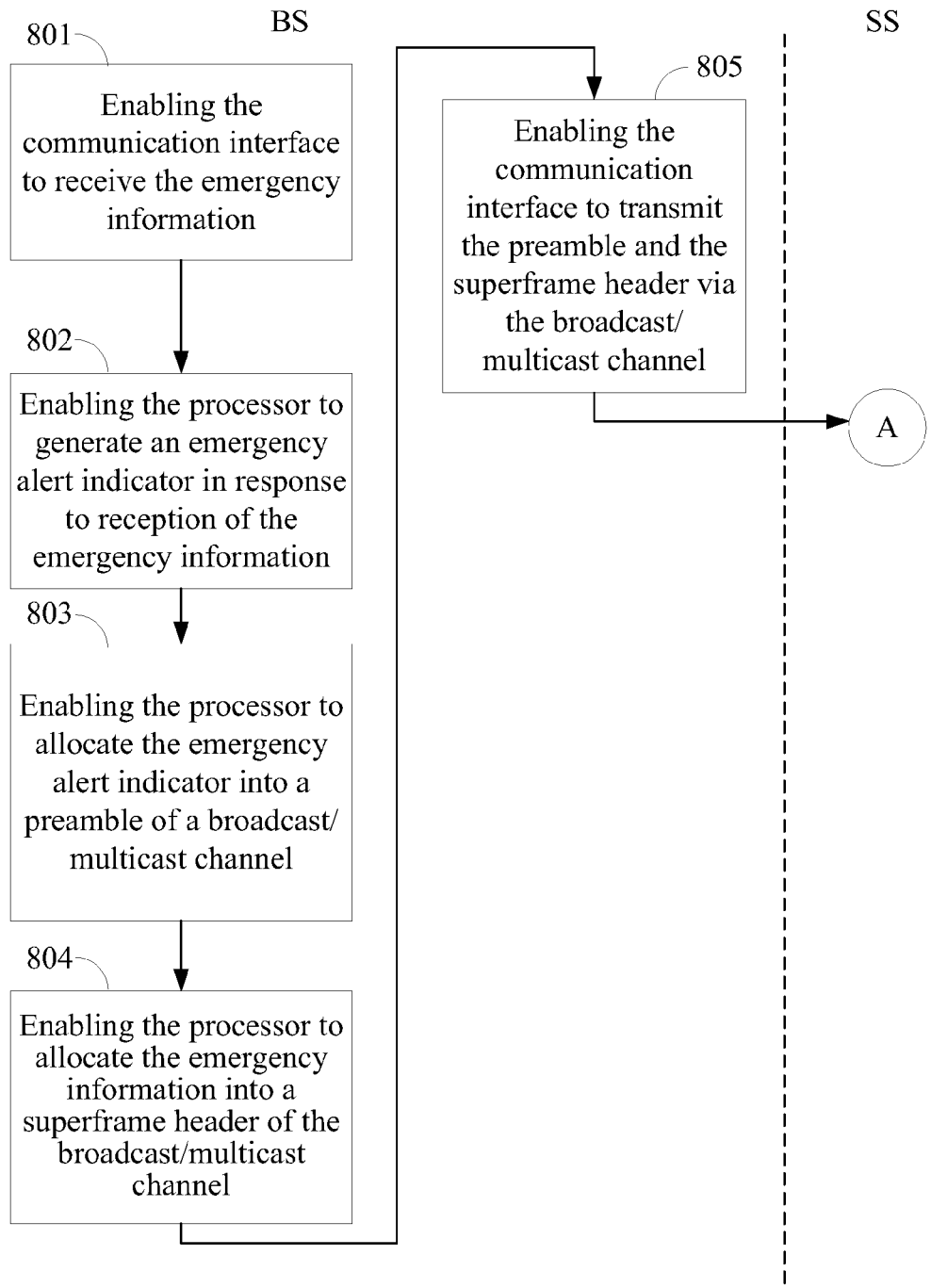
FIGS. 9A-9R are schematic views of a second embodiment of the present invention.
Figure 9B:
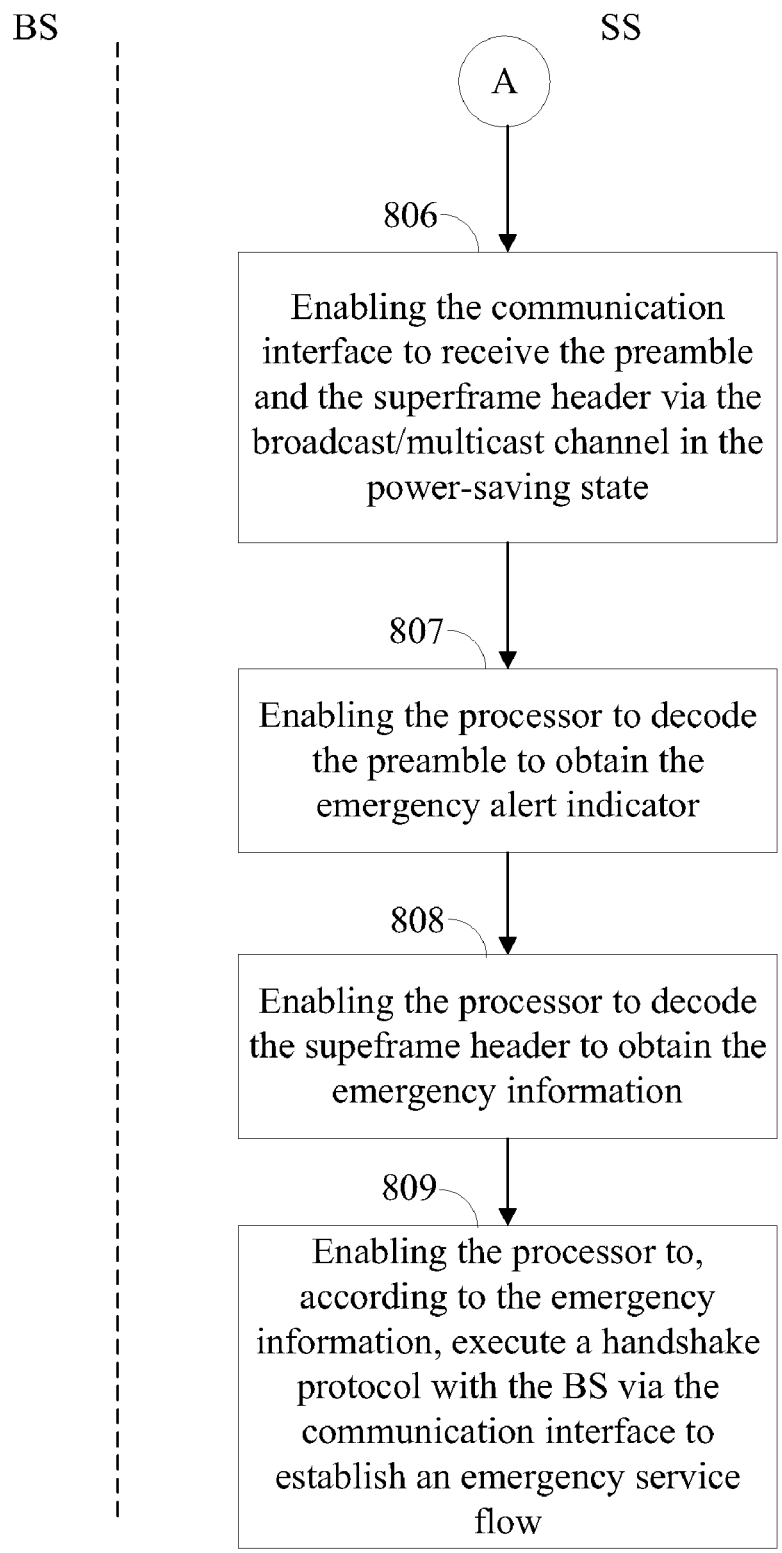
Figure 9C:
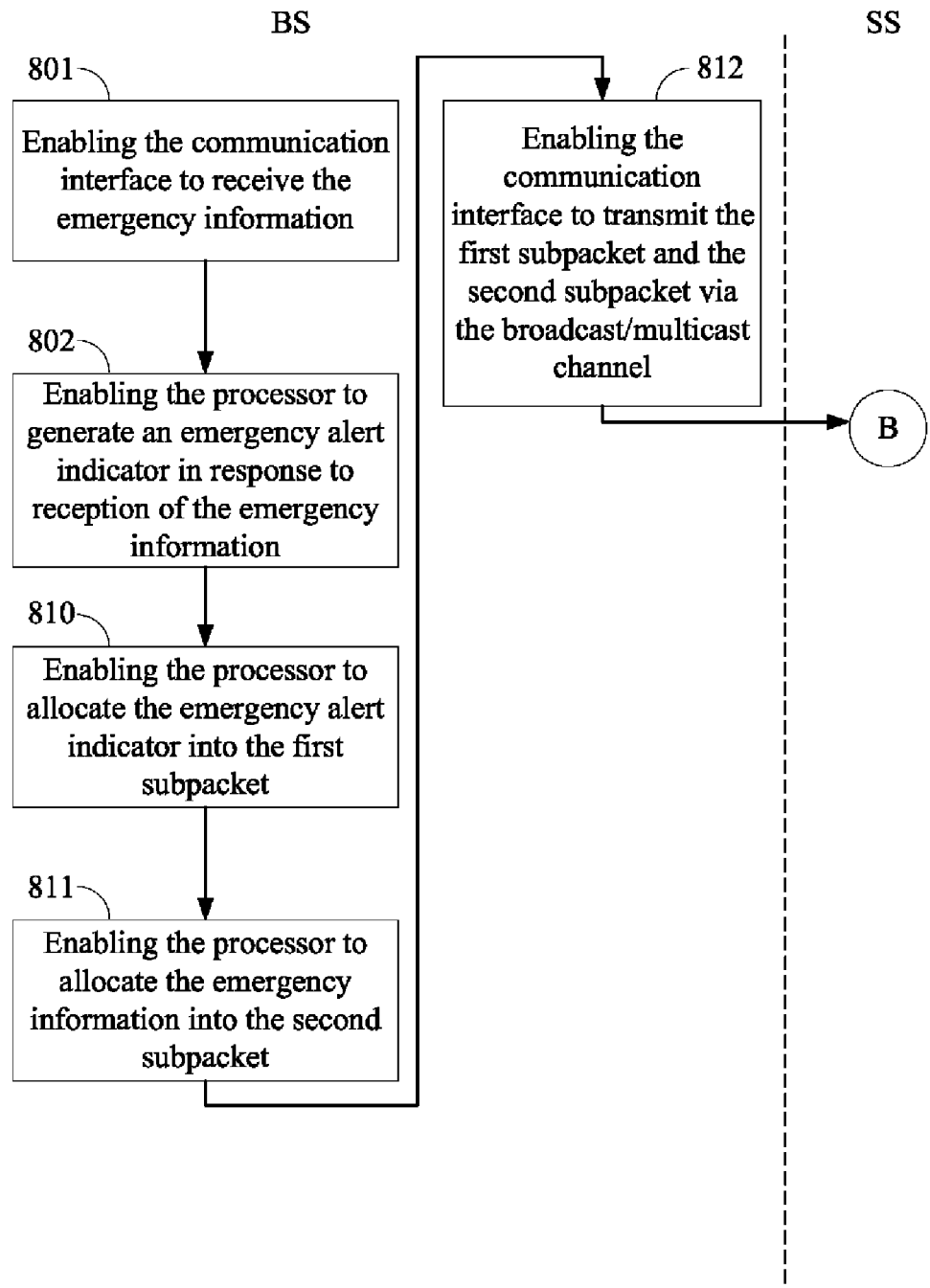
Figure 9D:
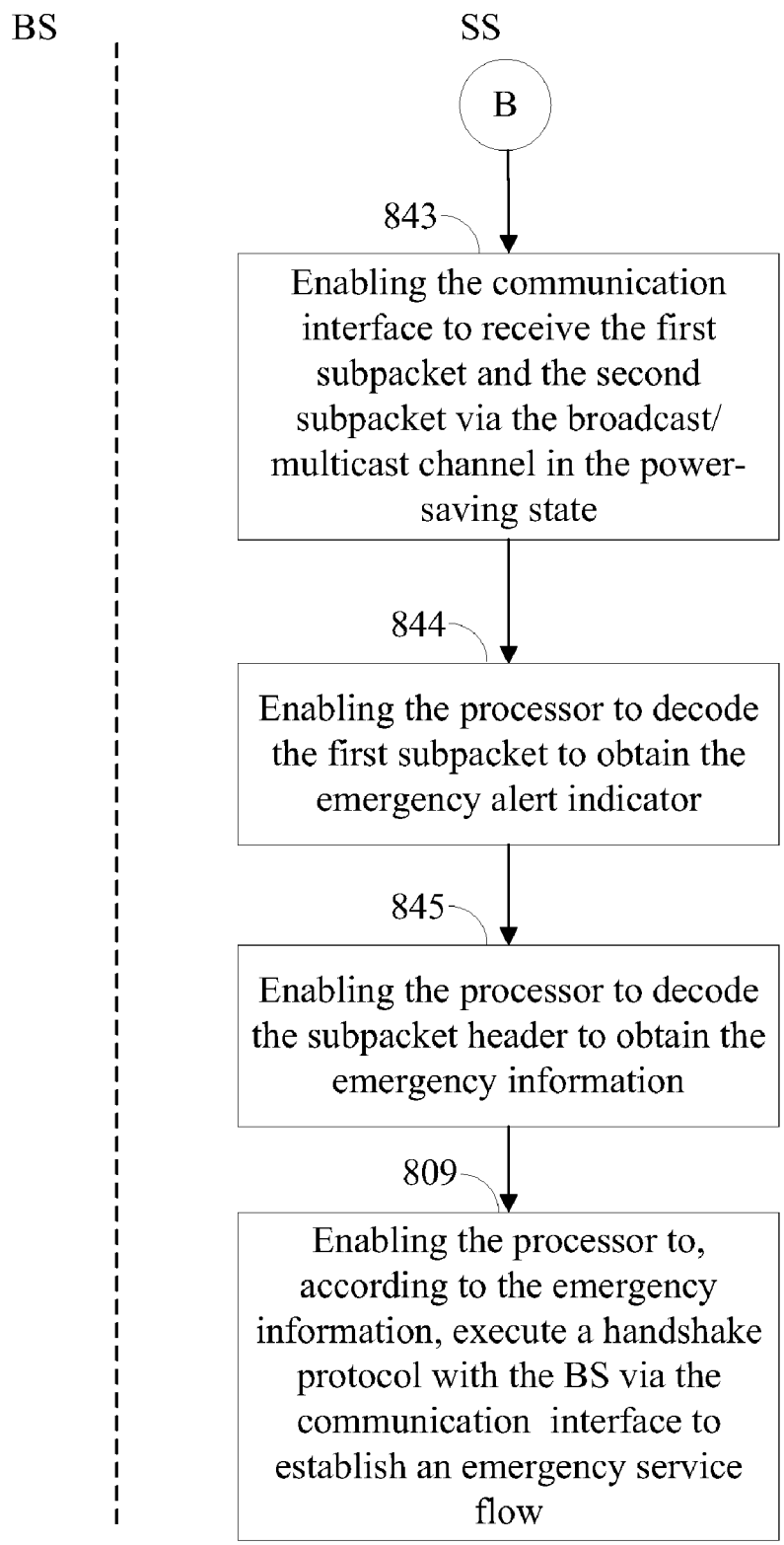
Figure 9E:
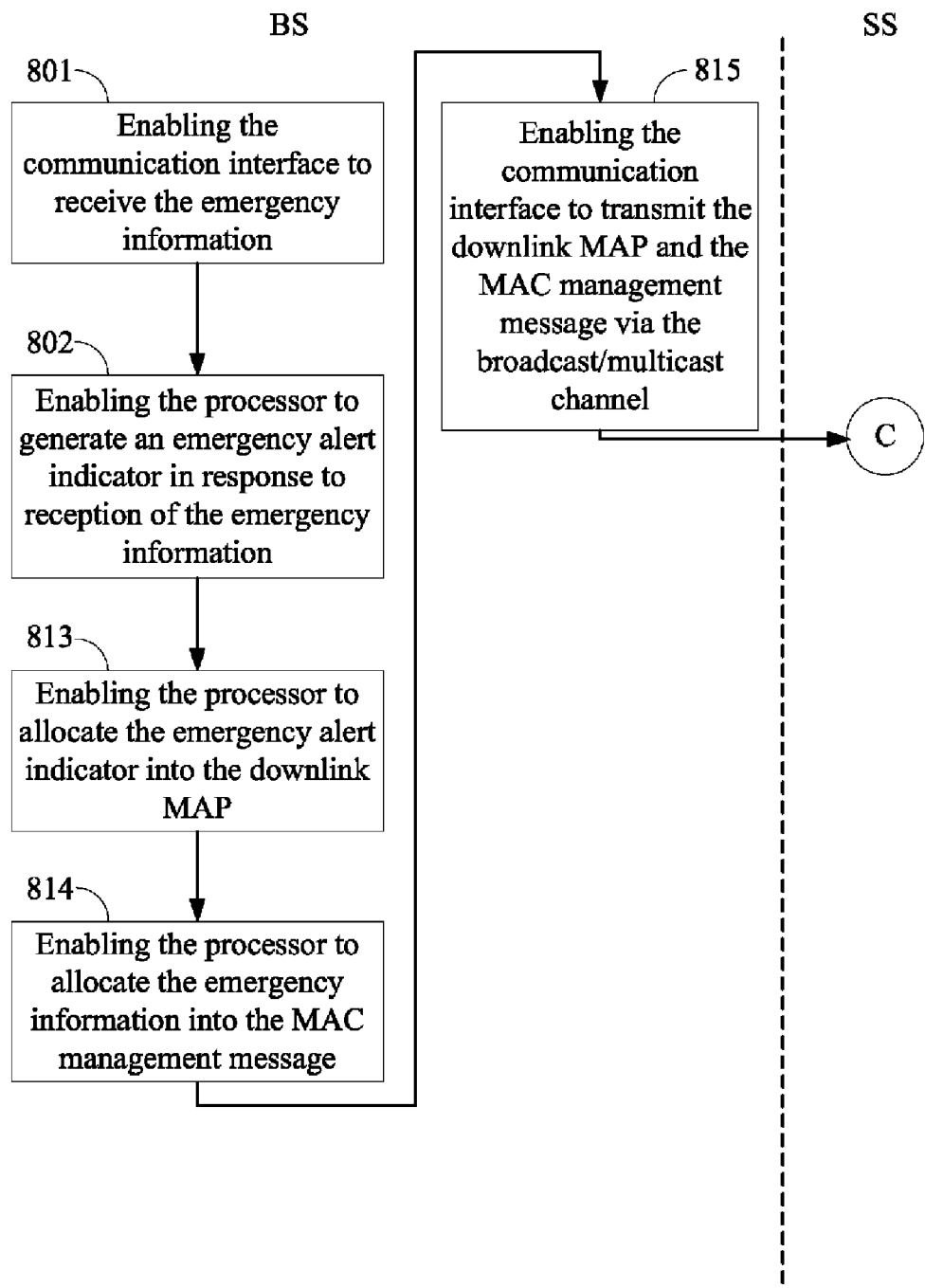
Figure 9F:
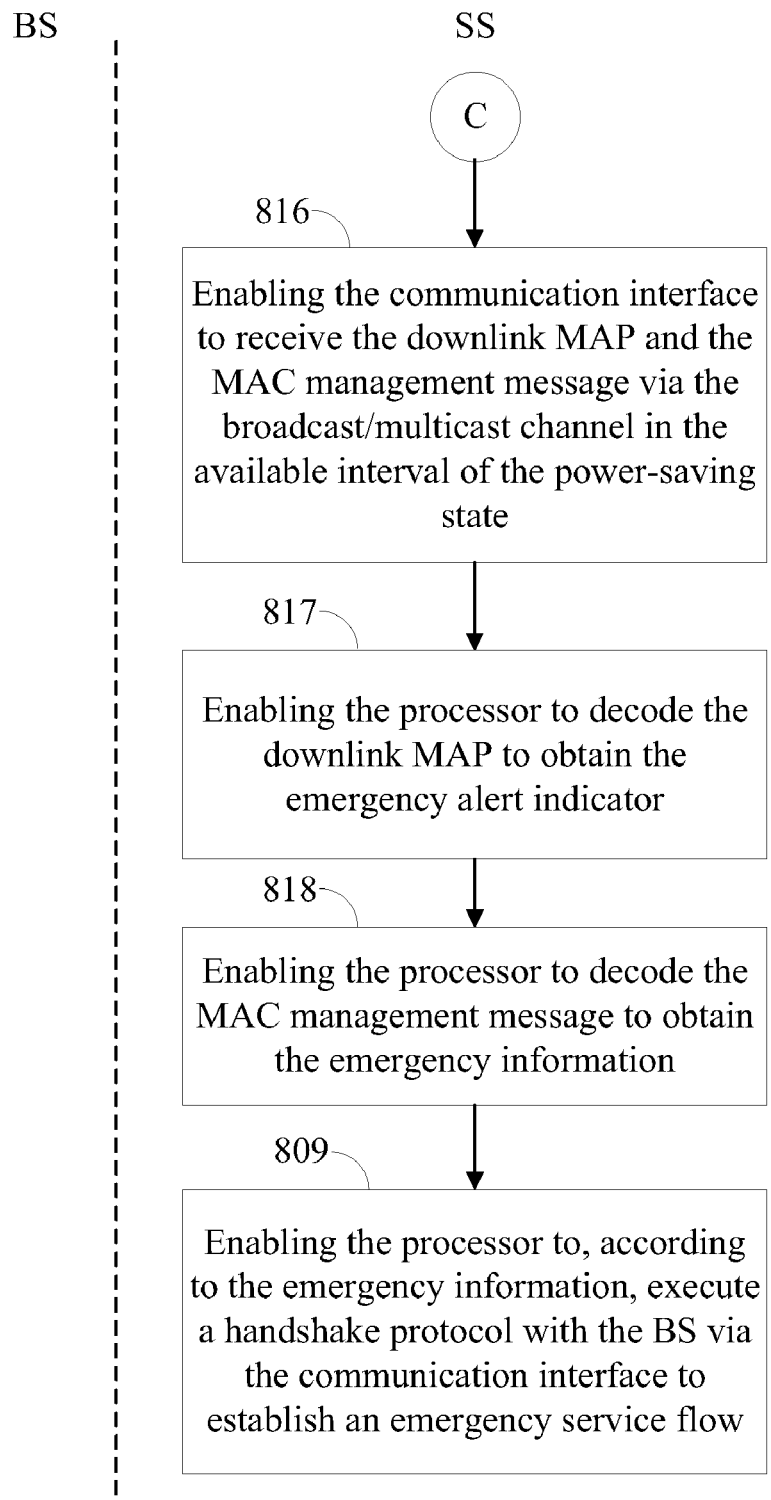
Figure 9G:
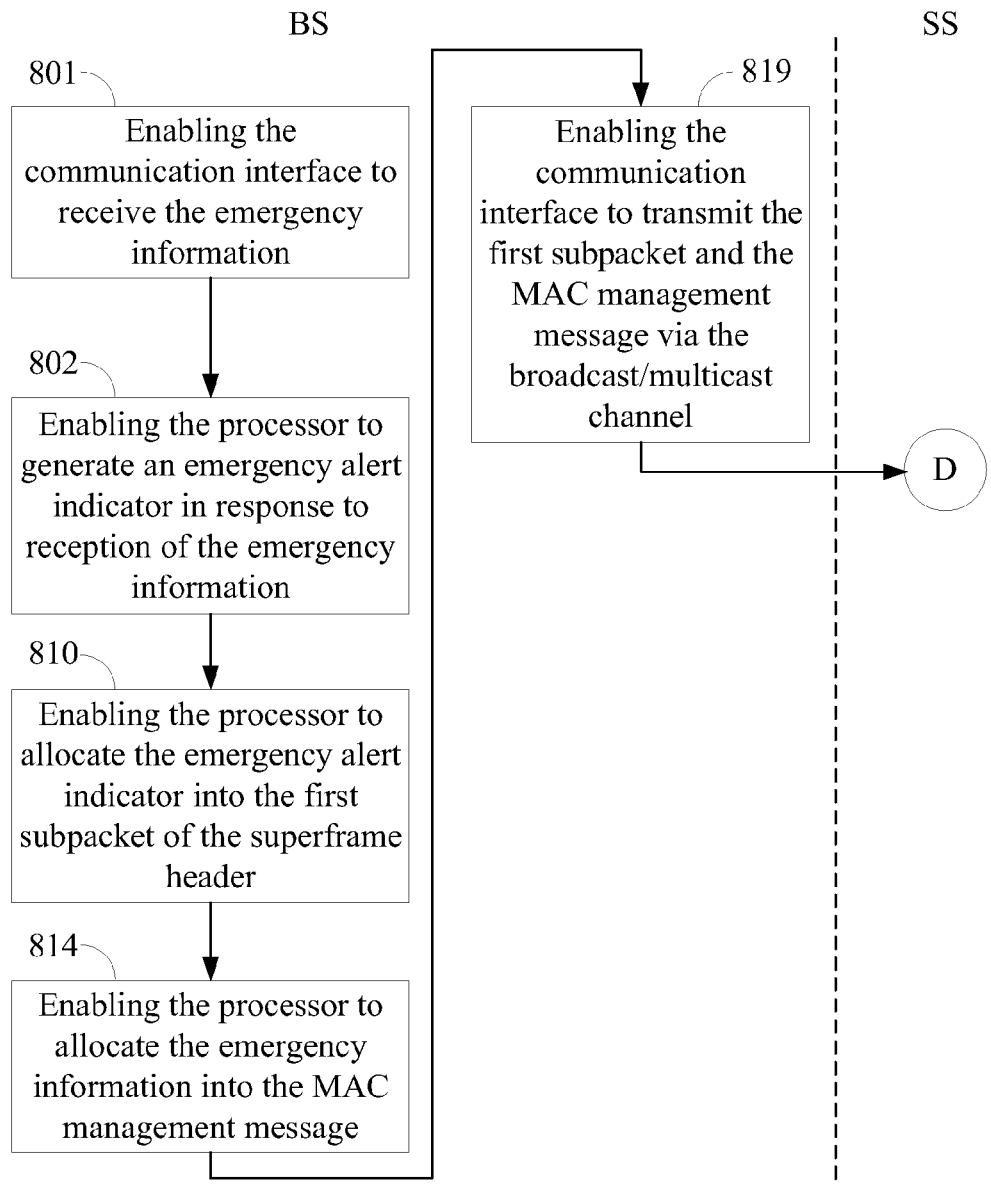
Figure 9H:
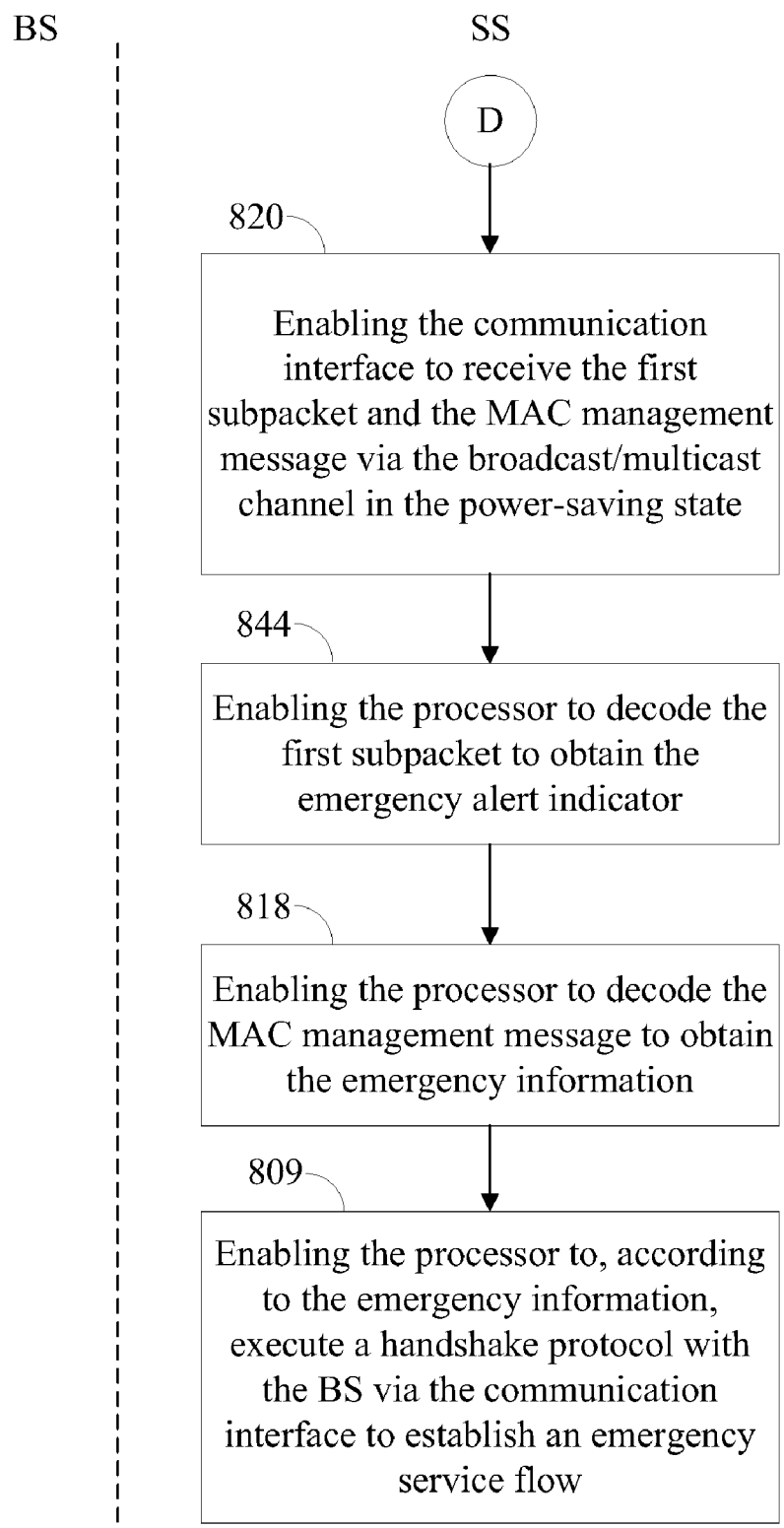
Figure 9I:
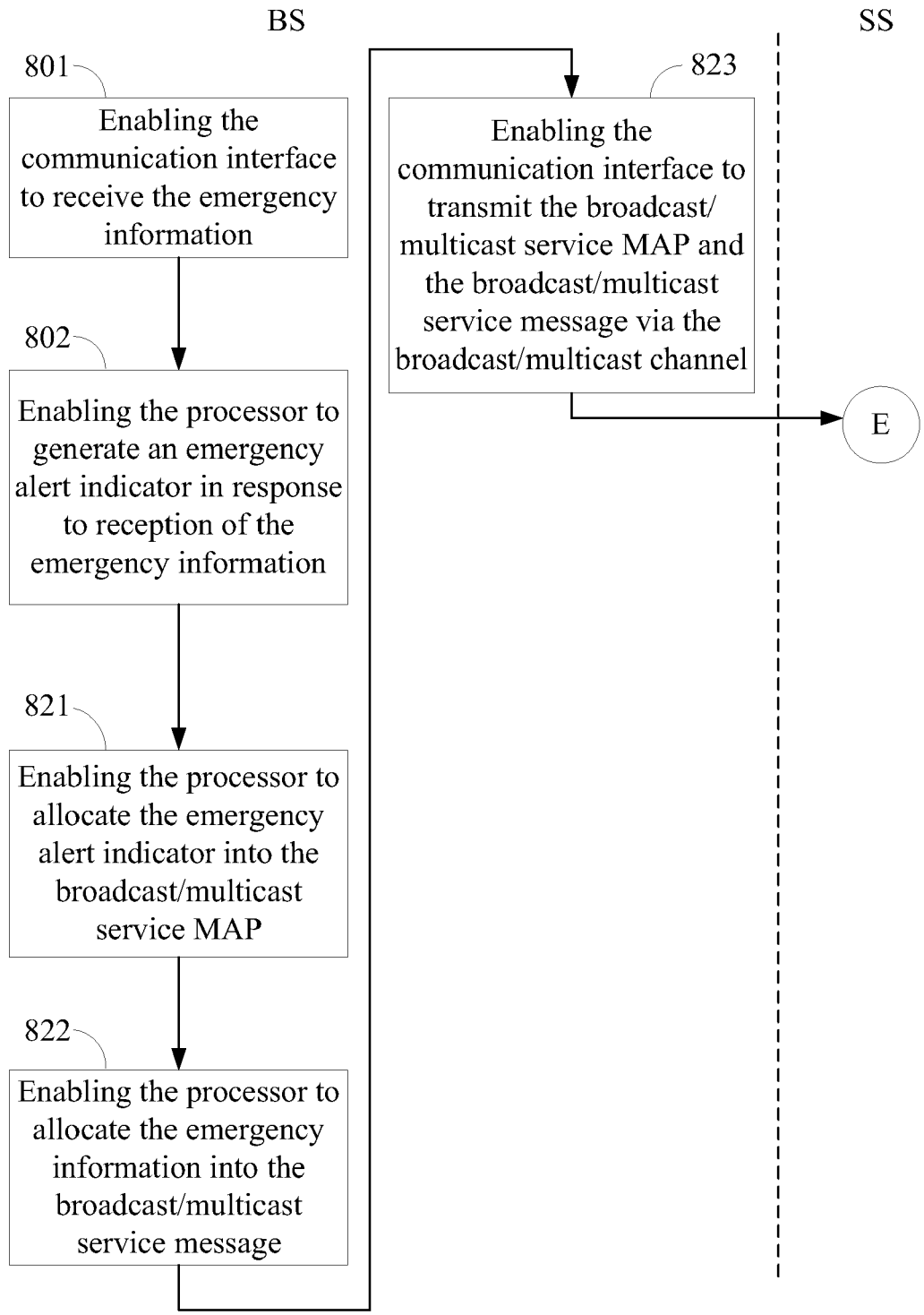
Figure 9J:
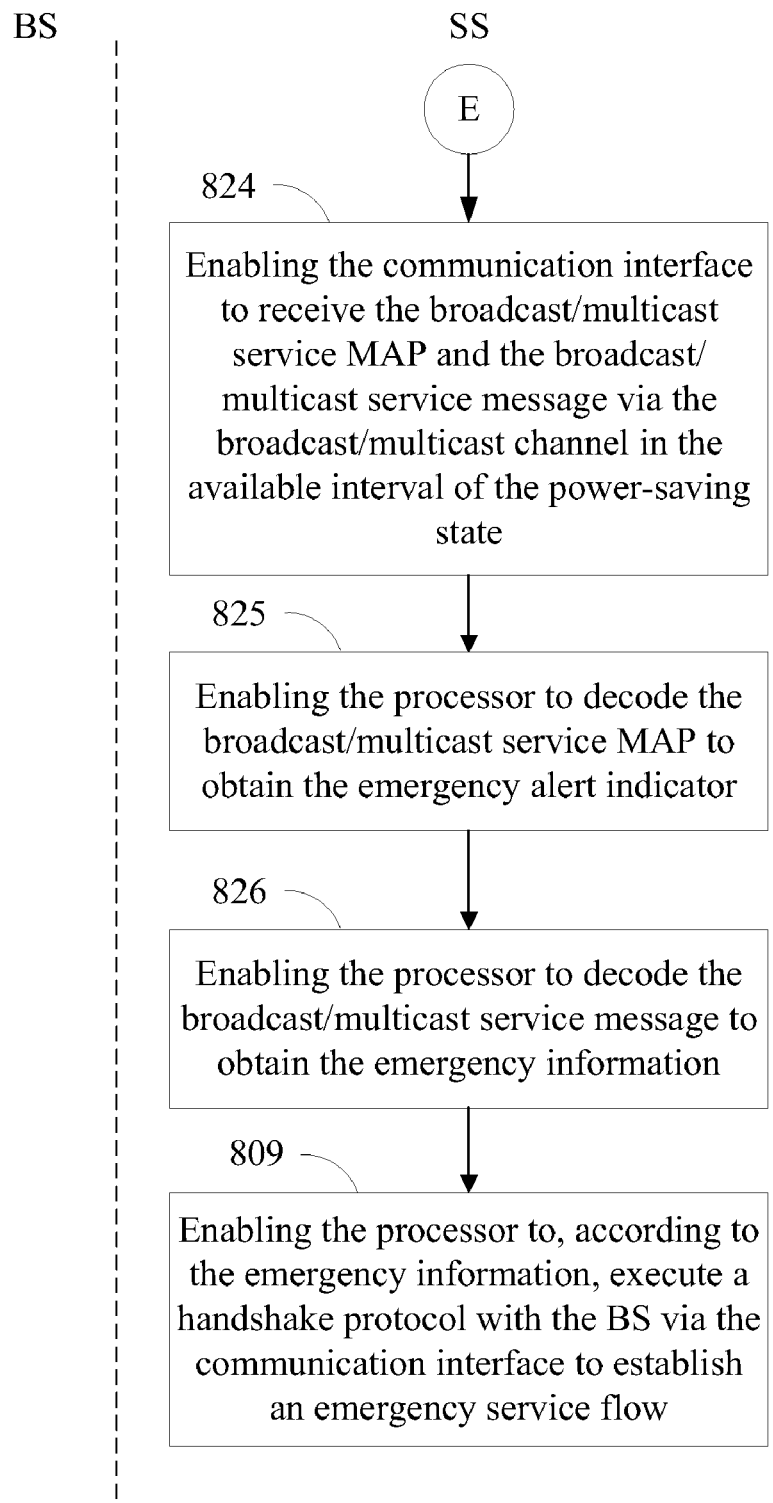
Figure 9K:
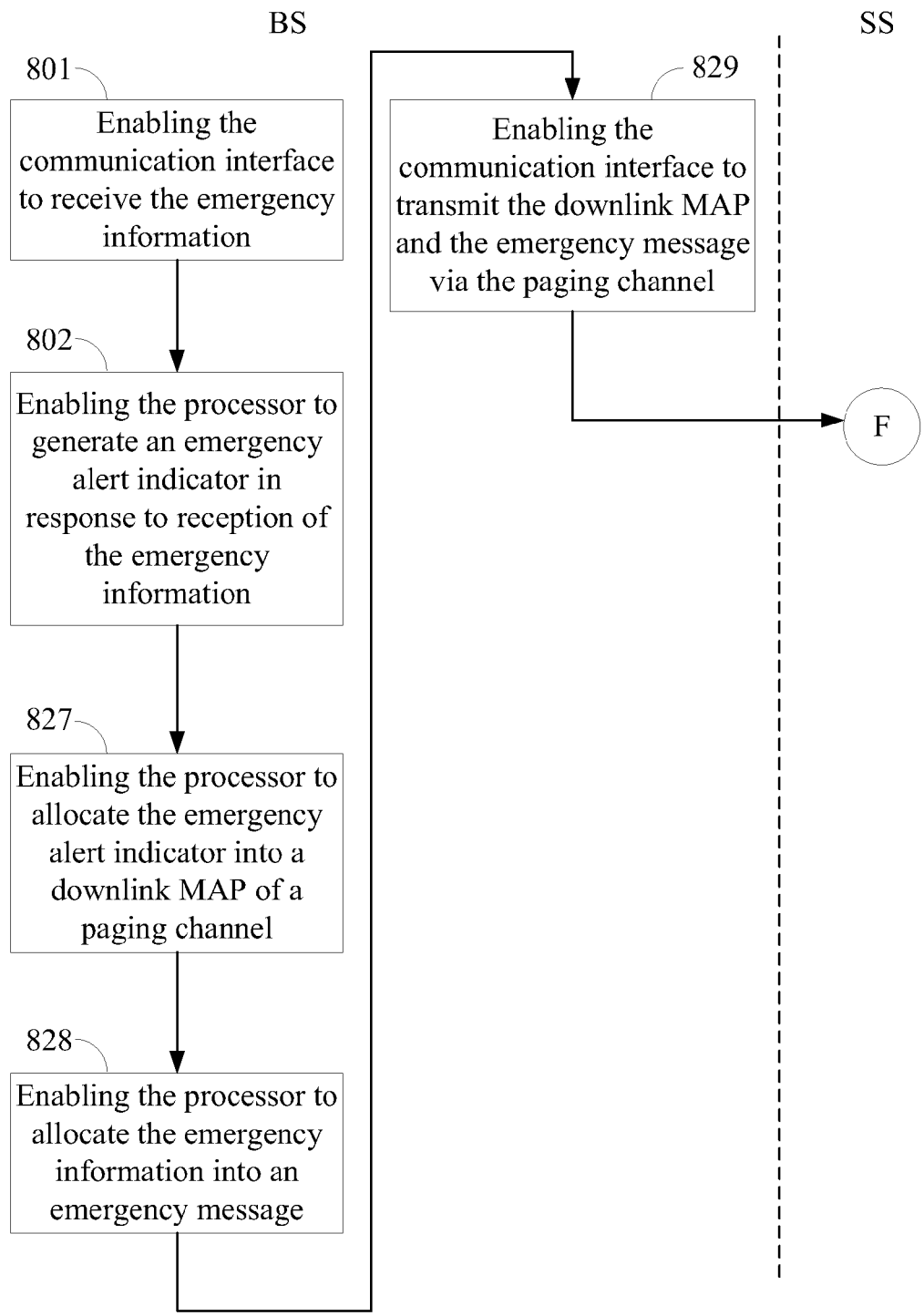
Figure 9L:
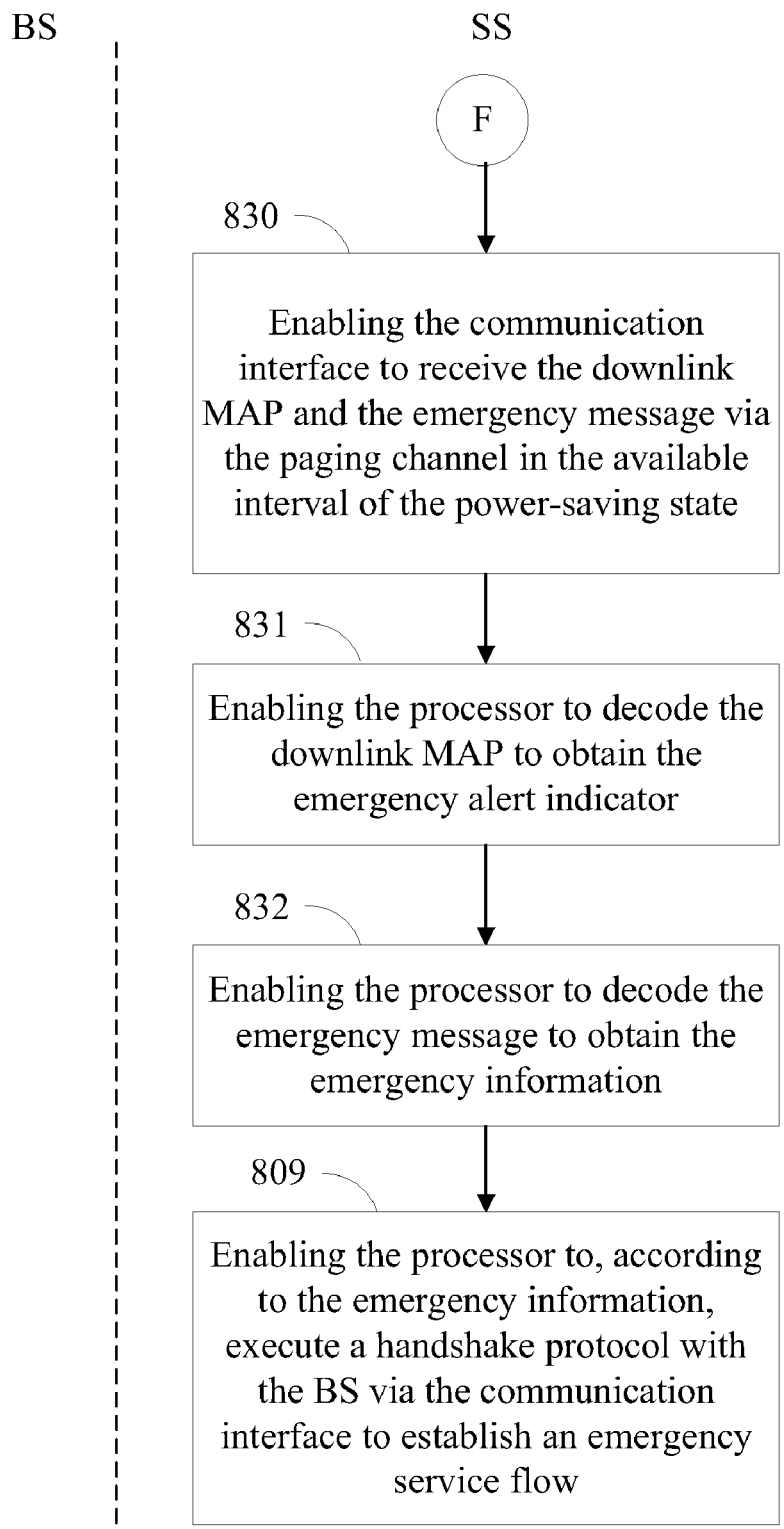
Figure 9M:
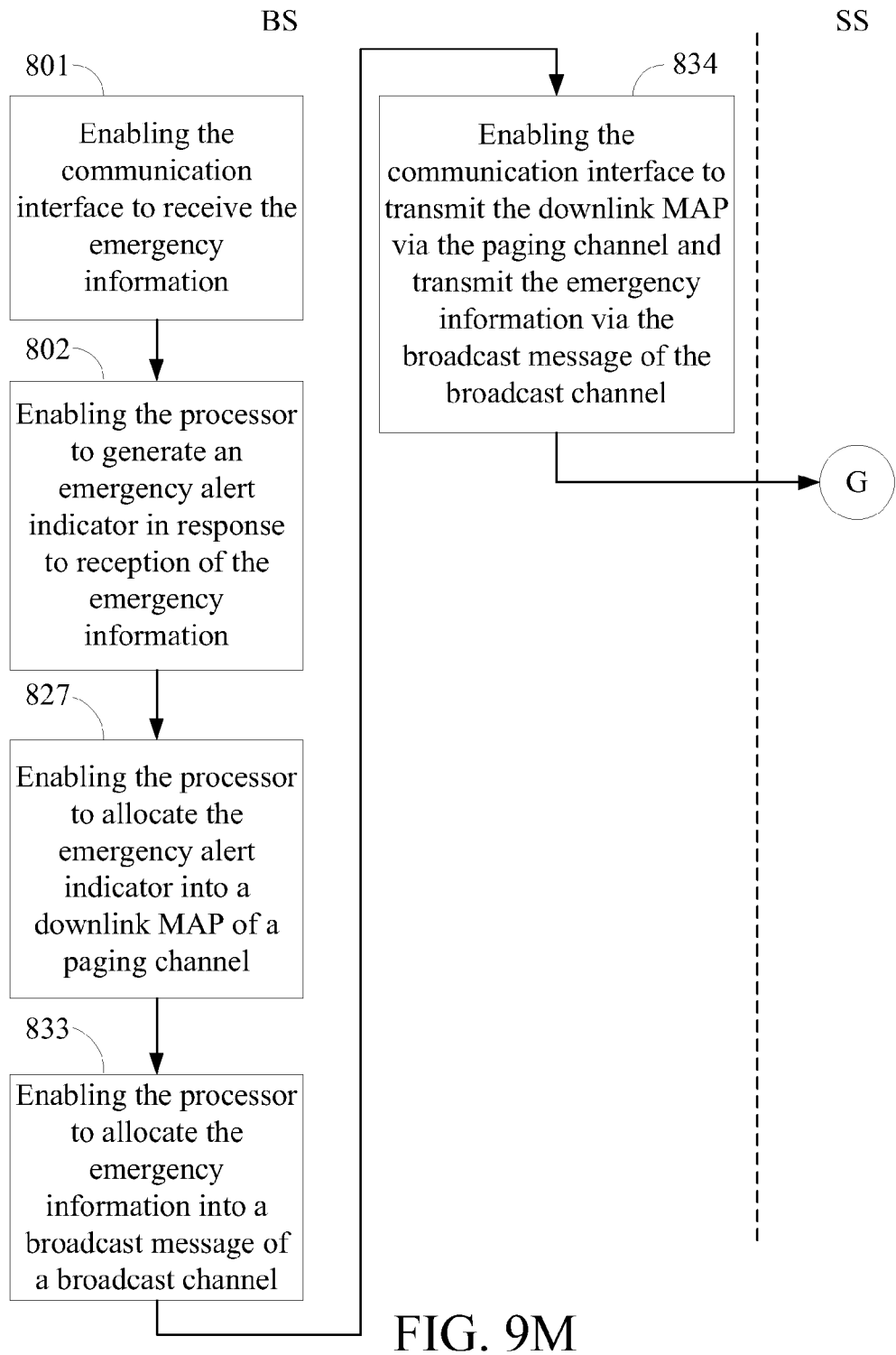
Figure 9N:
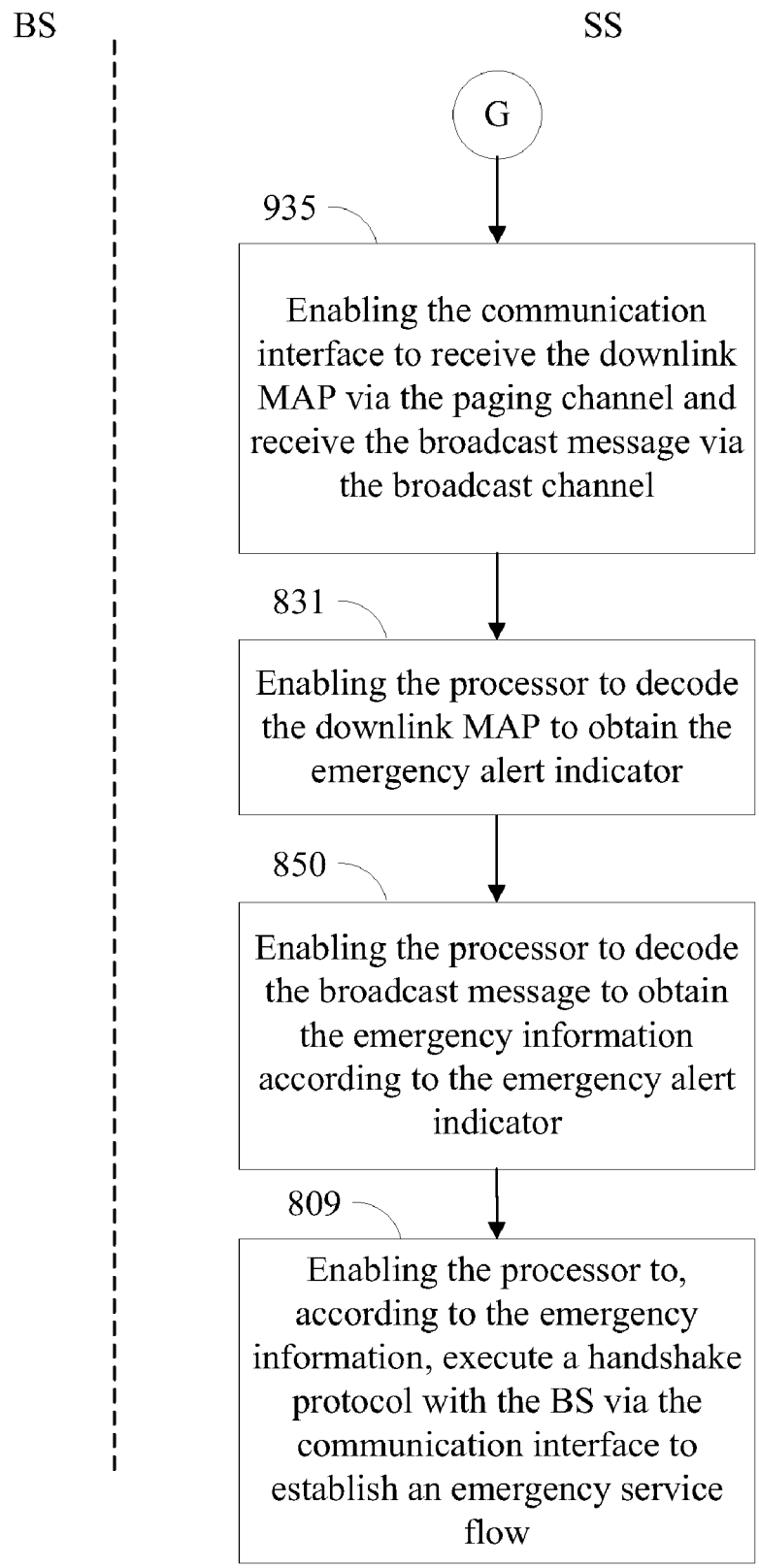
Figure 9O:
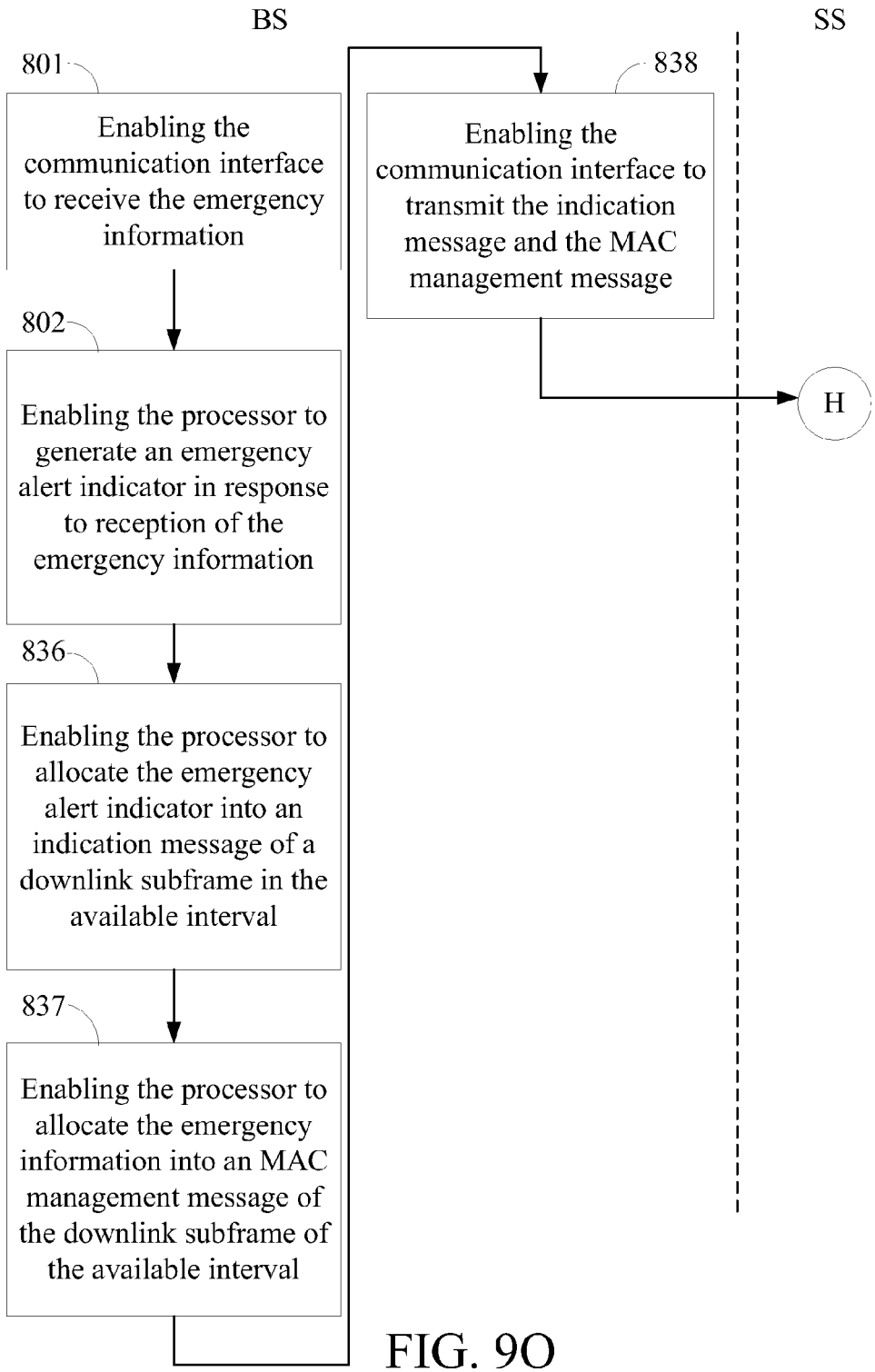
Figure 9P:
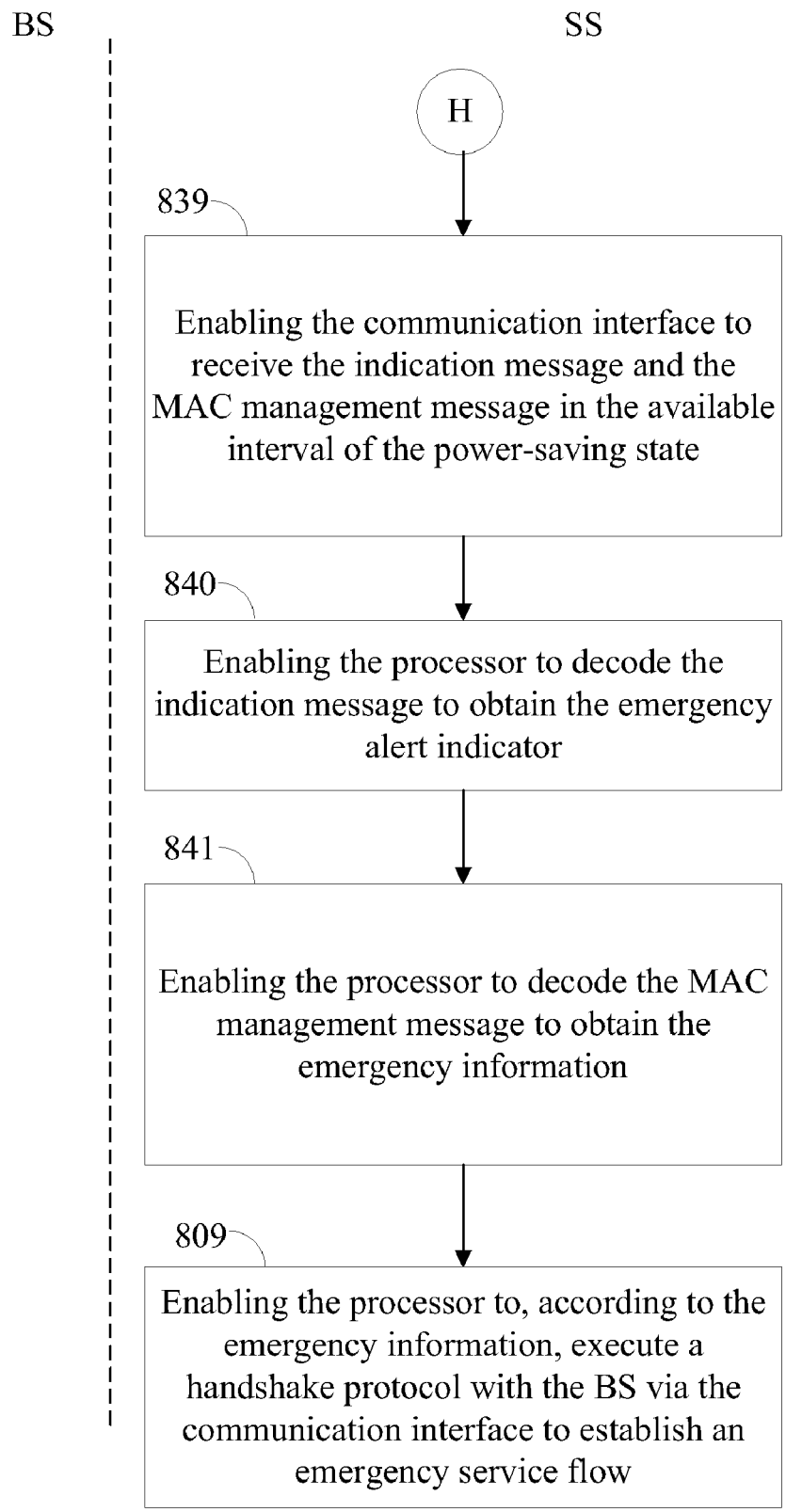

A second embodiment of the present invention is shown in FIG. 9A to FIG. 9P, which illustrate flowcharts of an emergency information transmission method adapted for the wireless network system described in the first embodiment. The hardware resources used during implementation of the method of this embodiment have already been described in the first embodiment, so they will not be further described herein.

Referring firstly to FIG. 9A, at the BS side, step 801 is executed to enable the communication interface to receive the emergency information. Then, step 802 is executed to generate an emergency alert indicator in response to reception of the emergency information. Step 803 is executed to enable the processor to allocate the emergency alert indicator into a preamble of a broadcast/multicast channel, and step 804 is executed to enable the processor to allocate the emergency information into a superframe header of the broadcast/multicast channel. Afterwards, step 805 is executed to enable the communication interface to transmit the preamble and the superframe header via the broadcast/multicast channel so that the SS in the power-saving state can, after receiving the preamble and the superframe header, decode the preamble to obtain the emergency alert indicator and further decode the superframe header according to the emergency alert indicator to obtain the emergency information. The SS is further configured to perform corresponding actions in response to the emergency information.

Next, referring to FIG. 9B, at the SS side, step 806 is executed to enable the communication interface to receive the preamble and the superframe header via the broadcast/multicast channel in the power-saving state. Step 807 is executed to enable the processor to decode the preamble to obtain the emergency alert indicator and to learn from the emergency alert indicator that it needs to decode the superframe header. Then, step 808 is executed to enable the processor to decode the supeframe header to obtain the emergency information, and finally, step 809 is executed to enable the processor to, according to the emergency information, execute a handshake protocol with the BS via the communication interface to establish an emergency service flow.

Apart from transmitting the emergency information and establishing the emergency service flow according to the aforesaid steps, the present invention also provides several other ways to accomplish the same purpose. Please refer to FIG. 9C and FIG. 9D. The superframe header may comprise a first subpacket and a second subpacket. Referring firstly to FIG. 9C, at the BS side, step 801 is executed to enable the communication interface to receive the emergency information, and step 802 is executed to enable the processor to generate an emergency alert indicator in response to reception of the emergency information. Afterwards, step 810 is executed to enable the processor to allocate the emergency alert indicator into the first subpacket, and step 811 is executed to enable the processor to allocate the emergency information into the second subpacket. Then, step 812 is executed to enable the communication interface to transmit the first subpacket and the second subpacket via the broadcast/multicast channel.

Referring next to FIG. 9D, at the SS side, step 843 is executed to enable the communication interface to receive the first subpacket and the second subpacket via the broadcast/multicast channel in the power-saving state. Then, step 844 is executed to enable the processor to decode the first subpacket to obtain the emergency alert indicator and to learn from the emergency alert indicator that it needs to decode the second subpacket. Afterwards, step 845 is executed to enable the processor to decode the second subpacket to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9E and FIG. 9F. Referring firstly to FIG. 9E, when the SS is in an available interval of the power-saving state, the broadcast/multicast channel comprises a downlink MAP and an MAC management message. At the BS side, step 801 is executed to enable the communication interface to receive the emergency information, and step 802 is executed to enable the processor to generate an emergency alert indicator in response to reception of the emergency information. Then, step 813 is executed to enable the processor to allocate the emergency alert indicator into the downlink MAP, and step 814 is executed to enable the processor to allocate the emergency information into the MAC management message. Afterwards, step 815 is executed to enable the communication interface to transmit the downlink MAP and the MAC management message via the broadcast/multicast channel.

Referring next to FIG. 9F, at the SS side, step 816 is executed to enable the communication interface to receive the downlink MAP and the MAC management message via the broadcast/multicast channel in the available interval of the power-saving state. Step 817 is executed to enable the processor to decode the downlink MAP to obtain the emergency alert indicator and to learn from the emergency alert indicator that it needs to decode the MAC management message. Then, step 818 is executed to enable the processor to decode the MAC management message to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9G and FIG. 9H. Referring firstly to FIG. 9G, the broadcast/multicast channel further comprises an MAC management message. At the BS side, step 801 is executed to enable the communication interface to receive the emergency information, and step 802 is executed to enable the processor to generate an emergency alert indicator in response to reception of the emergency information. Then, step 810 is executed to enable the processor to allocate the emergency alert indicator into the first subpacket of the superframe header, and step 814 is executed to enable the processor to allocate the emergency information into the MAC management message. Afterwards, step 819 is executed to enable the communication interface to transmit the first subpacket of the superframe header and the MAC management message via the broadcast/multicast channel.

Referring next to FIG. 9H, at the SS side, step 820 is executed to enable the communication interface to receive the first subpacket of the superframe header and the MAC management message via the broadcast/multicast channel in the power-saving state. Then, step 844 is executed to enable the processor to decode the first subpacket to obtain the emergency alert indicator and to learn from the emergency alert indicator that it needs to decode the MAC management message. Step 818 is executed to enable the processor to decode the MAC management message to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9I and FIG. 9J. Referring firstly to FIG. 9I, when the SS is in an available interval of the power-saving state, the broadcast/multicast channel comprises a broadcast/multicast service MAP and a broadcast/multicast service message. At the BS side, step 801 is executed to enable the communication interface to receive the emergency information, and step 802 is executed to enable the processor to generate an emergency alert indicator in response to reception of the emergency information. Then, step 821 is executed to enable the processor to allocate the emergency alert indicator into the broadcast/multicast service MAP, and step 822 is executed to enable the processor to allocate the emergency information into the broadcast/multicast service message. Afterwards, step 823 is executed to enable the communication interface to transmit the broadcast/multicast service MAP and the broadcast/multicast service message via the broadcast/multicast channel.

Referring next to FIG. 9J, at the SS side, step 824 is executed to enable the communication interface to receive the broadcast/multicast service MAP and the broadcast/multicast service message via the broadcast/multicast channel in the available interval of the power-saving state. Then, step 825 is executed to enable the processor to decode the broadcast/multicast service MAP to obtain the emergency alert indicator and to learn from the emergency alert indicator that it needs to decode the broadcast/multicast service message. Afterwards, step 826 is executed to enable the processor to decode the broadcast/multicast service message to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9K and FIG. 9L. Referring firstly to FIG. 9K, when the SS is in an available interval of the power-saving state, at the BS side, step 801 is executed to enable the communication interface to receive the emergency information, and step 802 is executed to enable the processor to generate an emergency alert indicator in response to reception of the emergency information. Here, the emergency alert indicator may be an indicator with one bit or an emergency alert paging identification. Then, step 827 is executed to enable the processor to allocate the emergency alert indicator into a downlink MAP of a paging channel, and step 828 is executed to enable the processor to allocate the emergency information into an indication message. Afterwards, step 829 is executed to enable the communication interface to transmit the downlink MAP and the indication message via the paging channel.

Referring next to FIG. 9L, at the SS side, step 830 is executed to enable the communication interface to receive the downlink MAP and the indication message via the paging channel in the available interval of the power-saving state. Then, step 831 is executed to enable the processor to decode the downlink MAP to obtain the emergency alert indicator and to learn from the emergency alert indicator that it needs to decode the indication message. Afterwards, step 832 is executed to enable the processor to decode the indication message to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9M and FIG. 9N. Referring firstly to FIG. 9M, when the SS is in an available interval of the power-saving state, at the BS side, step 801 is executed to enable the communication interface to receive the emergency information, and step 802 is executed to enable the processor to generate an emergency alert indicator in response to reception of the emergency information. Then, step 827 is executed to enable the processor to allocate the emergency alert indicator into a downlink MAP of a paging channel, and step 833 is executed to enable the processor to allocate the emergency information into a broadcast message of a broadcast channel. Afterwards, step 834 is executed to enable the communication interface to transmit the downlink MAP via the paging channel and transmit the emergency information via the broadcast message of the broadcast channel.

Referring next to FIG. 9N, at the SS side, step 835 is executed to enable the communication interface to receive the downlink MAP via the paging channel and receive the broadcast message via the broadcast channel. Then, step 831 is executed to enable the processor to decode the downlink MAP to obtain the emergency alert indicator, and learn from the emergency alert indicator that it needs to decode the broadcast message. Step 850 is executed to enable the processor to decode the broadcast message to obtain the emergency information. Finally, step 809 is executed to enable the processor to, according to the emergency information, execute a handshake protocol with the BS via the communication interface to establish an emergency service flow.

Next, another way to transmit the emergency information and establish the emergency service flow will be described with reference to FIG. 9O and FIG. 9P. Referring firstly to FIG. 9O, when the SS is in an available interval of the power-saving state, at the BS side, step 801 is executed to enable the communication interface to receive the emergency information, and step 802 is executed to enable the processor to generate an emergency alert indicator in response to reception of the emergency information. Here, the emergency alert indicator may be an indicator with one bit or an emergency alert paging identification. Then, step 836 is executed to enable the processor to allocate the emergency alert indicator into an indication message of a downlink subframe in the available interval, and step 837 is executed to enable the processor to allocate the emergency information into an MAC management message of the downlink subframe of the available interval. Afterwards, step 838 is executed to enable the communication interface to transmit the indication message and the MAC management message. It shall be appreciated that, in other embodiments, the emergency alert indicator and the emergency information may also be allocated into an indication message and an MAC management message of different downlink subframes respectively.

Referring next to FIG. 9P, at the SS side, step 839 is executed to enable the communication interface to receive the paging message and the MAC management message in the available interval of the power-saving state. Then, step 840 is executed to enable the processor to decode the paging message to obtain the emergency alert indicator, and step 841 is executed to enable the processor to, according to the emergency alert indicator, decode the MAC management message to obtain the emergency information. Finally, step 809 is executed to enable the processor to, according to the emergency information, execute a handshake protocol with the BS via the communication interface to establish an emergency service flow.

Figure 9Q:
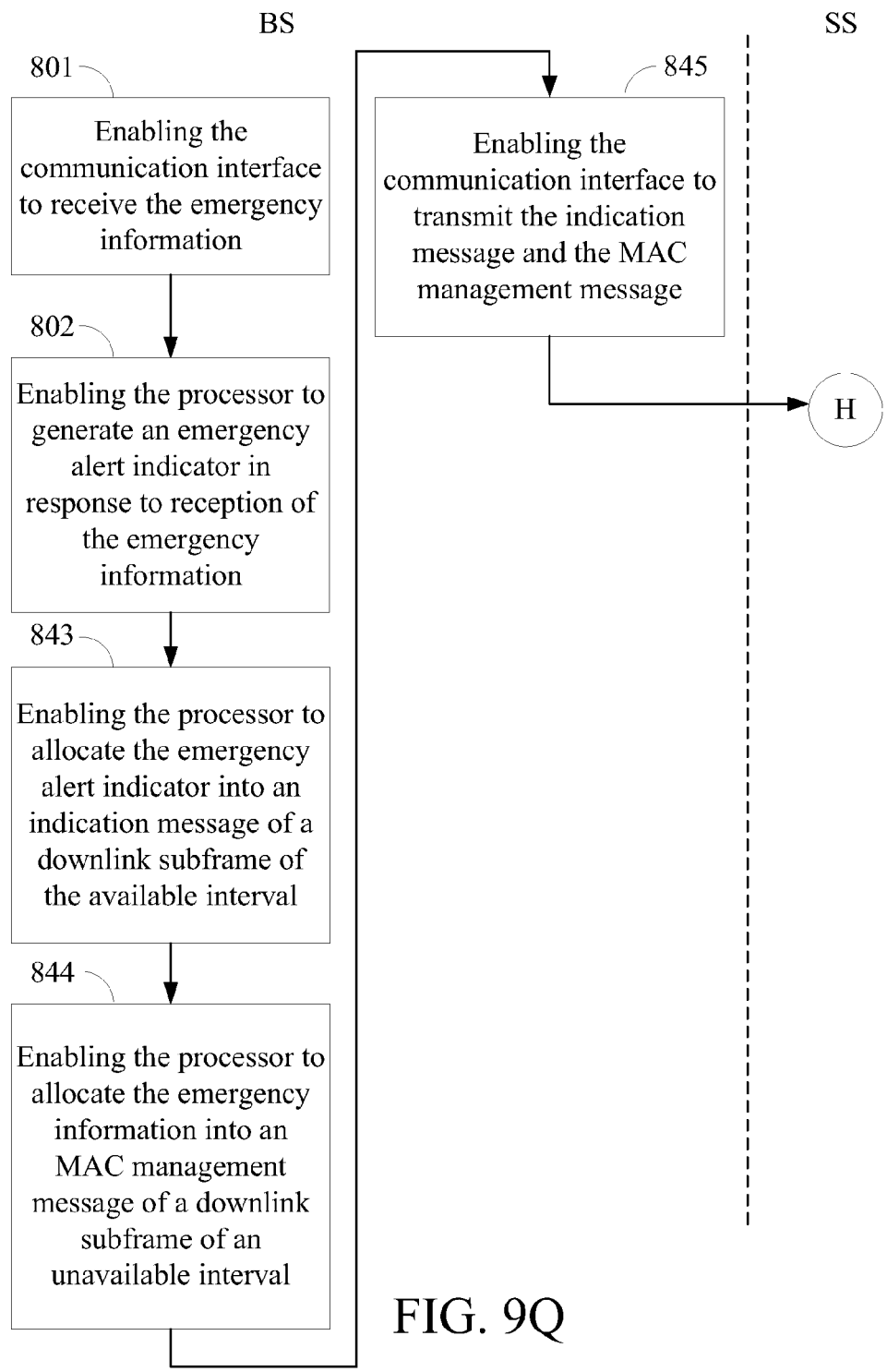

Next, another way to transmit the emergency information and establish the emergency service flow will be described with reference to FIG. 9Q and FIG. 9R. Referring firstly to FIG. 9Q, when the SS is in an available interval of the power-saving state, at the BS side, step 801 is executed to enable the communication interface to receive the emergency information, and step 802 is executed to enable the processor to generate an emergency alert indicator in response to reception of the emergency information. Here, the emergency alert indicator may be an indicator with one bit or an emergency alert paging identification. Then, step 843 is executed to enable the processor to allocate the emergency alert indicator into an indication message of a downlink subframe in the available interval, and step 844 is executed to enable the processor to allocate the emergency information into an MAC management message of a downlink subframe of an unavailable interval. Afterwards, step 845 is executed to enable the communication interface to transmit the indication message and the MAC management message.

Figure 9R:
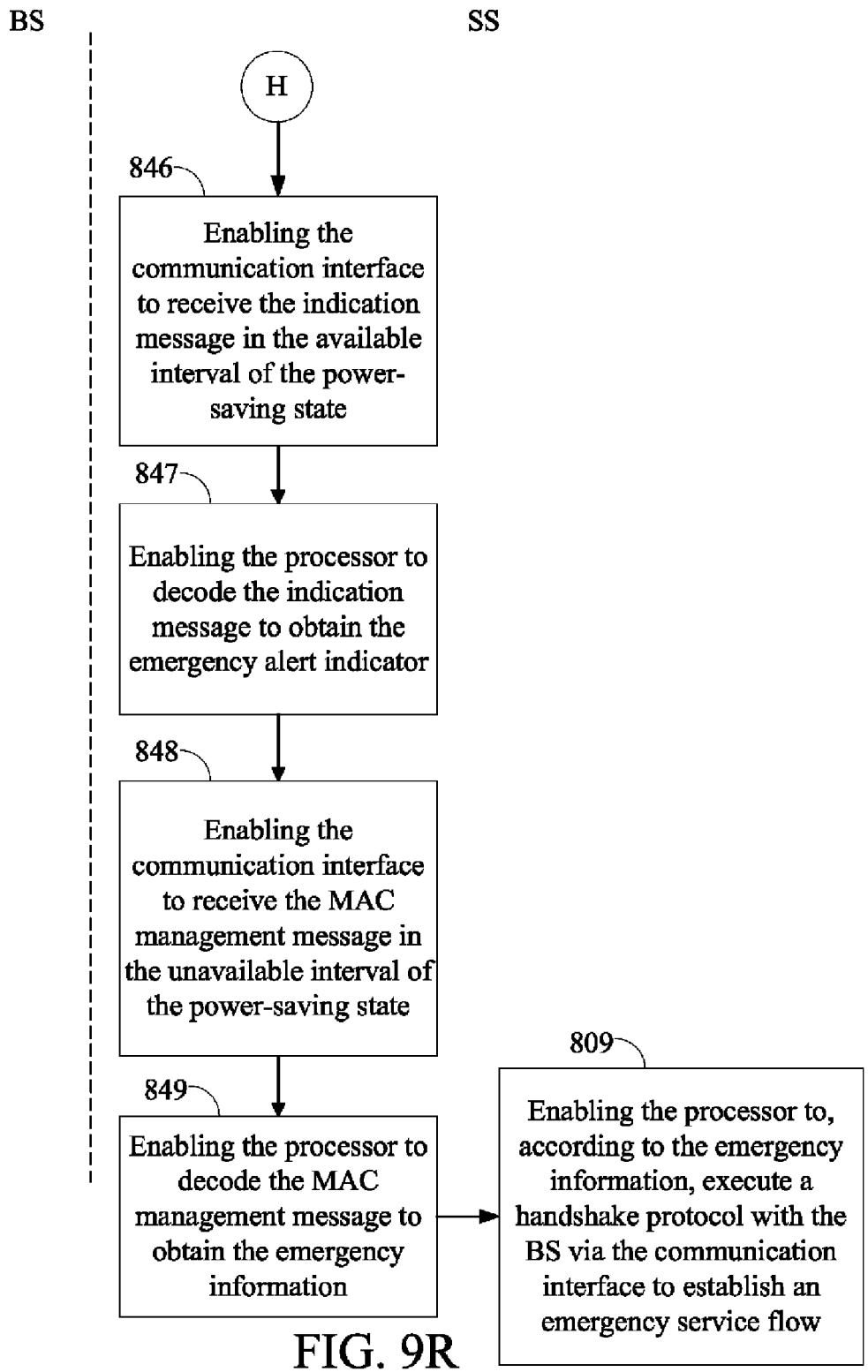

Referring next to FIG. 9R, at the SS side, step 846 is executed to enable the communication interface to receive the indication message in the available interval of the power-saving state. Then, step 847 is executed to enable the processor to decode the indication message to obtain the emergency alert indicator and to learn from the emergency alert indicator that it needs to receive the MAC management message in an unavailable interval. Afterwards, step 848 is executed to enable the communication interface to, according to the emergency alert indicator, receive the MAC management message in the unavailable interval, and step 849 is executed to enable the processor to decode the MAC management message to obtain the emergency information. Finally, step 809 is executed to enable the processor to, according to the emergency information, execute a handshake protocol with the BS via the communication interface to establish an emergency service flow.

More particularly, if the SS is in an idle mode of the power-saving state, then each of the aforesaid indication messages may be a paging message; and if the SS is in a sleep mode of the power-saving state, then each of the aforesaid indication messages may be a traffic-indication message, although the present invention is not limited thereto.

Next, how the SS executes the handshake protocol with the BS to establish the emergency service flow (i.e., step 809) will be described. Generally speaking, the SS will execute different handshake protocols depending on whether it has been registered with the BS. Hereinbelow, a case in which the SS has not been registered with the BS will be described at first.

When the SS has not been registered with the BS, the SS needs to be registered with the BS while it is executing a handshake protocol with the BS. Therefore, the predefined emergency preamble comprises an emergency service notification and an authentication notification so that the registration and the establishment of the emergency service flow can be carried out simultaneously.

Figure 10A:
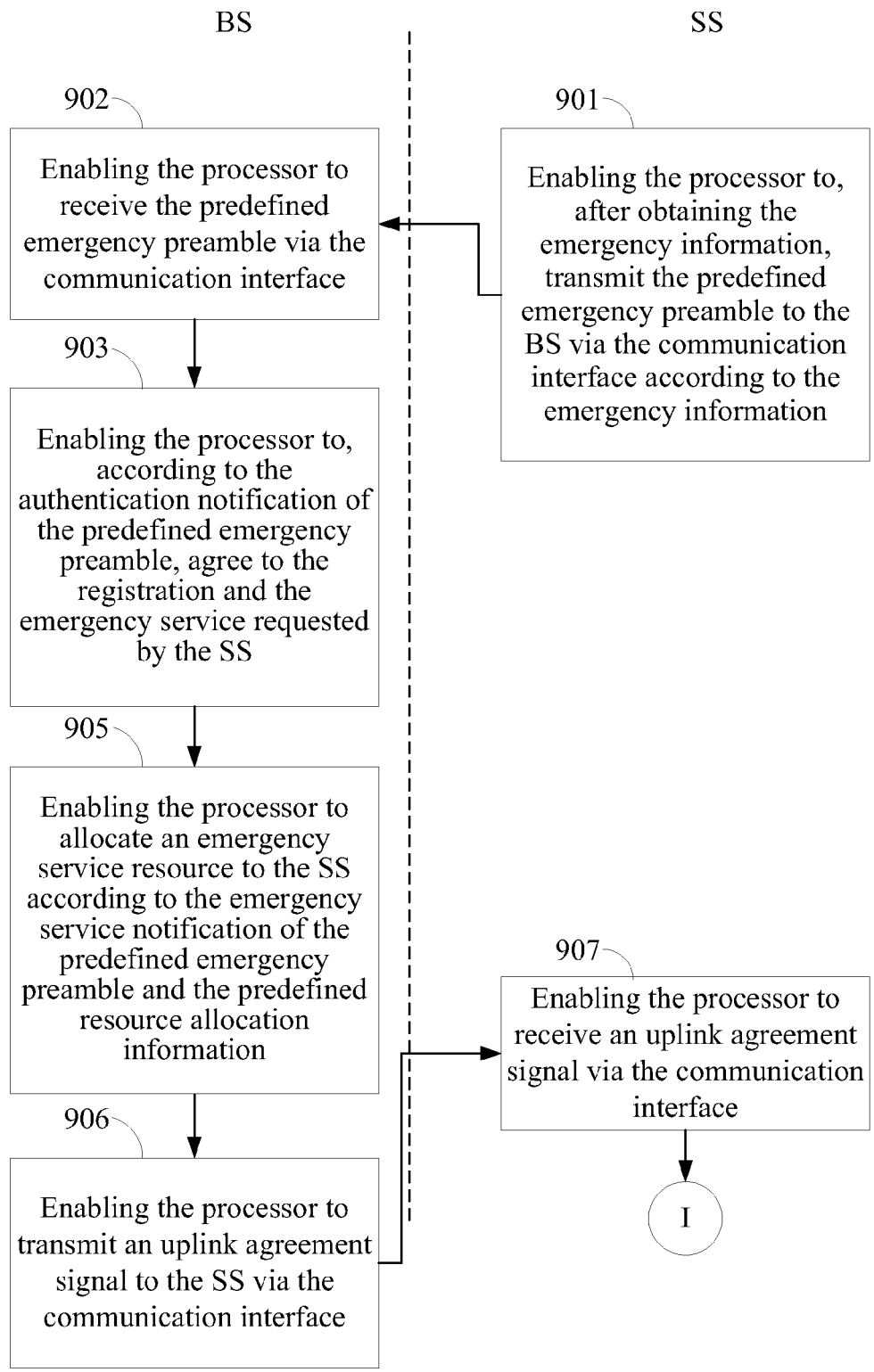
FIGS. 10A-13 are flowcharts of processes of establishing an emergency service flow according to the second embodiment.
Figure 10B:
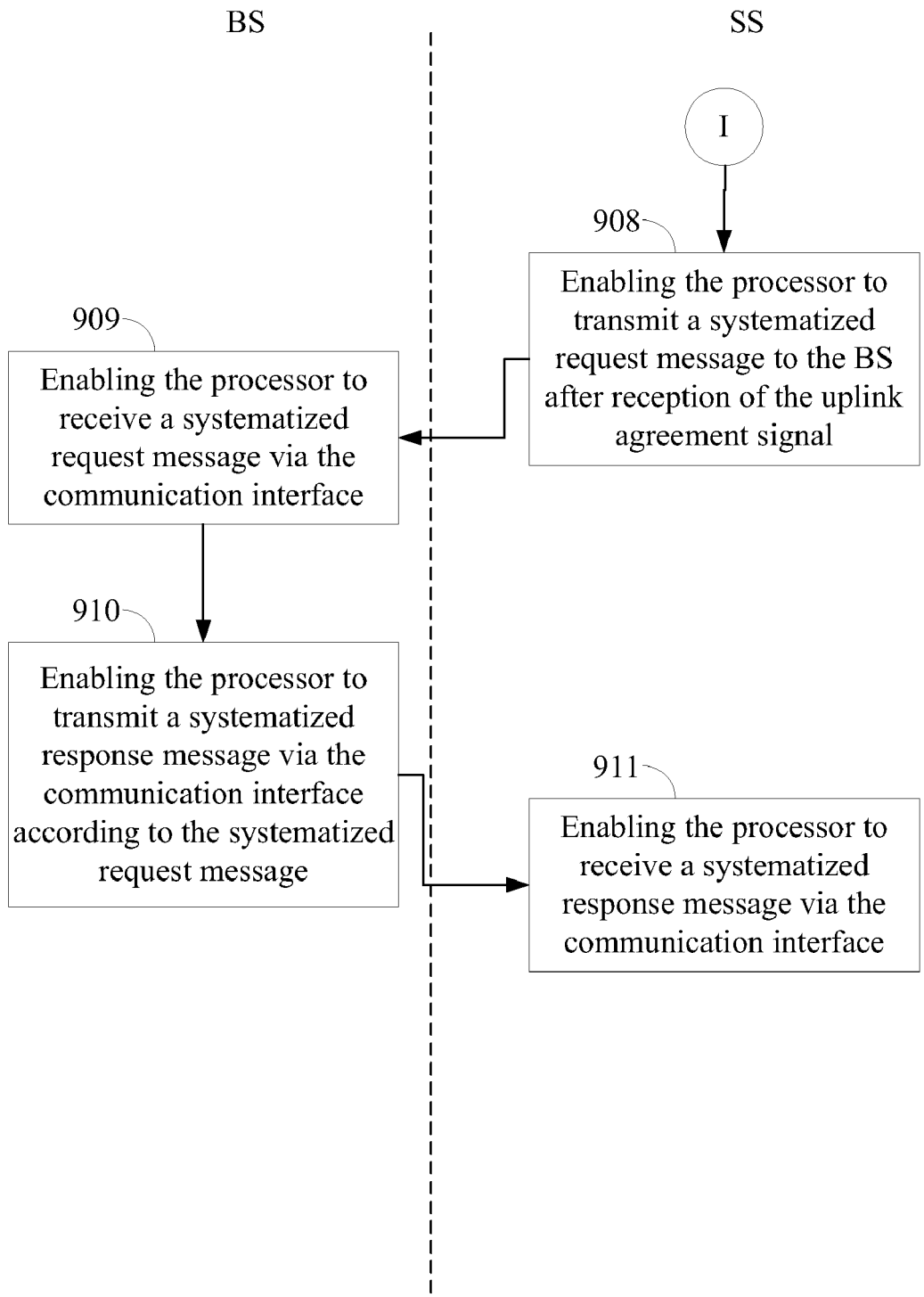

Referring to FIG. 10A and FIG. 10B, step 809 comprises the following steps. Referring firstly to FIG. 10A, step 901 is executed by the SS to enable the processor to, after obtaining the emergency information, transmit the predefined emergency preamble to the BS via the communication interface according to the emergency information. Then, step 902 is executed by the BS to enable the processor to receive the predefined emergency preamble via the communication interface, and step 903 is executed by the BS to enable the processor to, according to the authentication notification of the predefined emergency preamble, agree to the registration of the SS and the emergency service. Then, step 905 is executed by the BS to enable the processor to allocate an emergency service resource to the SS according to the emergency service notification of the predefined emergency preamble and the predefined resource allocation information, and step 906 is executed by the BS to enable the processor to transmit an uplink agreement signal to the SS via the communication interface. Afterwards, step 907 is executed by the SS to enable the processor to receive an uplink agreement signal via the communication interface after transmission of the predefined emergency preamble.

Referring next to FIG. 10B, step 908 is executed by the SS to enable the processor to transmit a systematized request message to the BS after reception of the uplink agreement signal. Then, step 909 is executed by the BS to enable the processor to receive a systematized request message via the communication interface after transmission of the uplink agreement signal, and step 910 is executed by the BS to enable the processor to transmit a systematized response message via the communication interface according to the systematized request message. Finally, step 911 is executed by the SS to enable the processor to receive a systematized response message via the communication interface after transmission of the systematized request message.

Figure 11A:
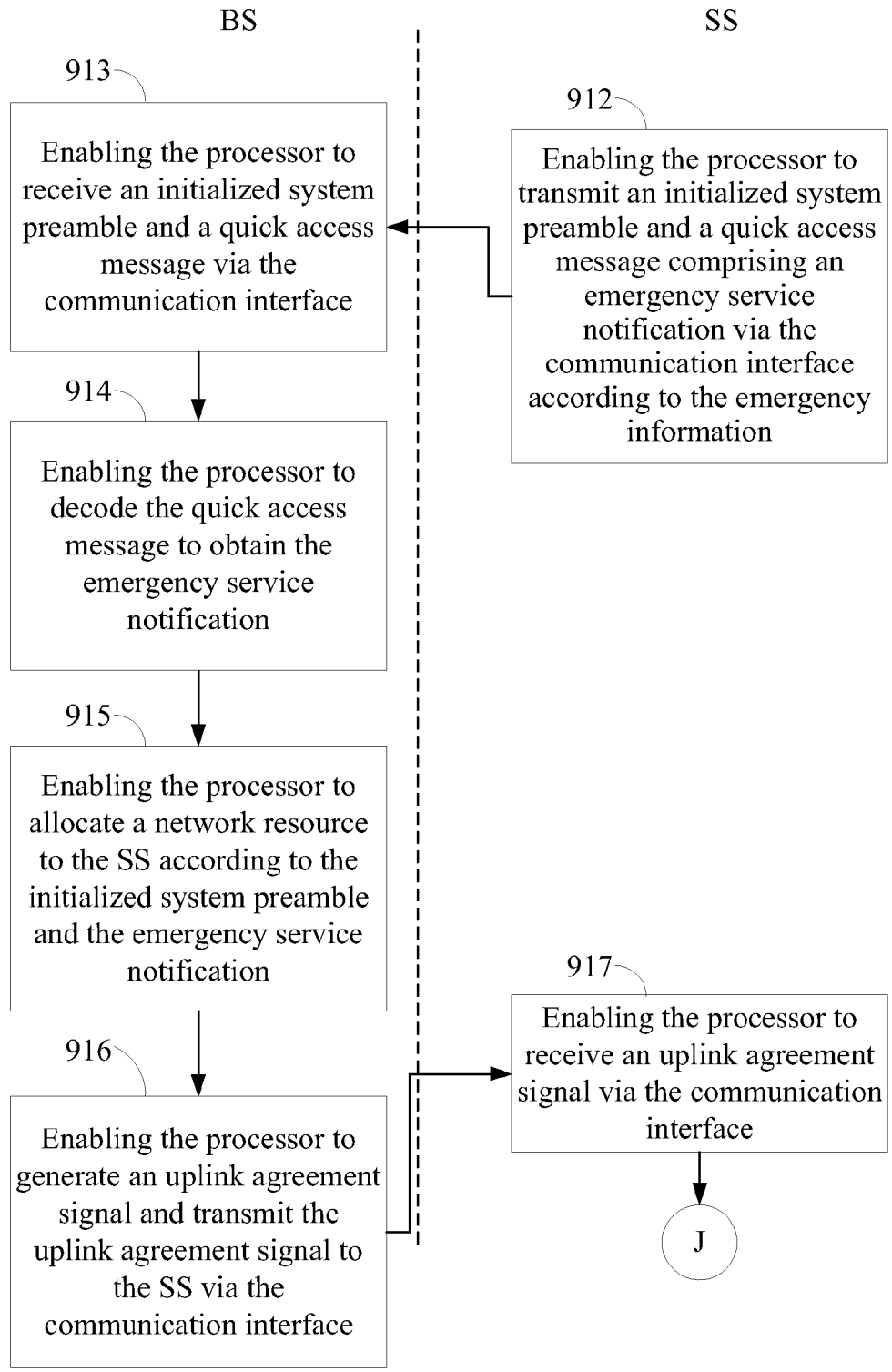
Figure 11B:
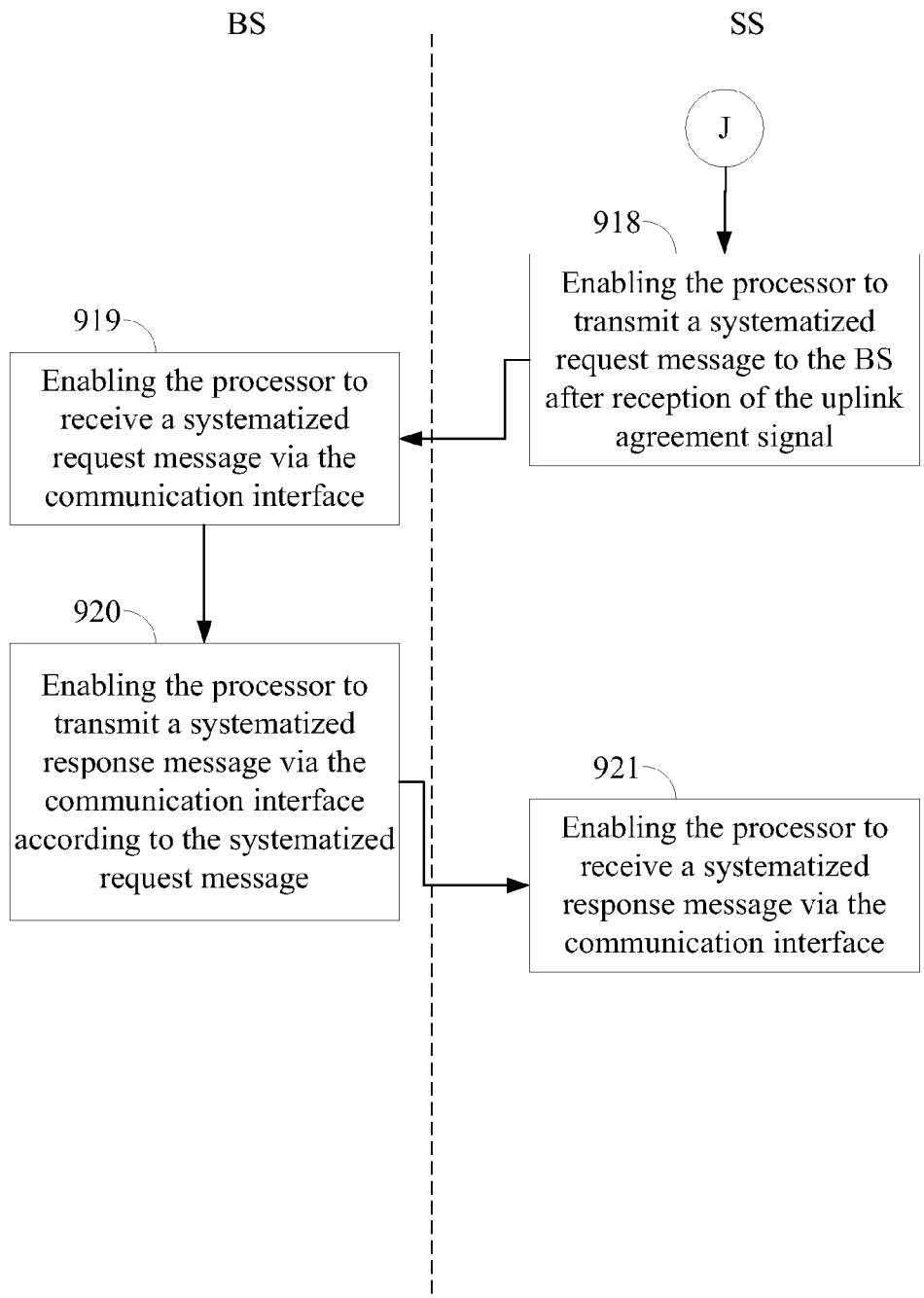

Besides the way described above, the SS that has not been registered with the BS may also accomplish the registration and the establishment of the emergency service flow simultaneously in the following way. Referring to FIG. 11A and FIG. 11B, step 809 comprises the following steps. Referring firstly to FIG. 11A, step 912 is executed by the SS to enable the processor to, after obtaining the emergency information, transmit an initialized system preamble and a quick access message comprising an emergency service notification to the BS via the communication interface according to the emergency information. Then, step 913 is executed by the BS to enable the processor to receive an initialized system preamble and a quick access message comprising an emergency service notification via the communication interface, and step 914 is executed by the BS to enable the processor to decode the quick access message to obtain the emergency service notification. Then, step 915 is executed by the BS to enable the processor to allocate a network resource to the SS according to the initialized system preamble and the emergency service notification, and step 916 is executed by the BS to enable the processor to, after allocating the network resource, generate an uplink agreement signal and transmit the uplink agreement signal to the SS via the communication interface. Afterwards, step 917 is executed by the SS to enable the processor to receive an uplink agreement signal via the communication interface after transmission of the initialized system preamble and the quick access message.

Referring next to FIG. 11B, step 918 is executed by the SS to enable the processor to transmit a systematized request message to the BS after reception of the uplink agreement signal. Then, step 919 is executed by the BS to enable the processor to receive a systematized request message via the communication interface after transmission of the uplink agreement signal, and step 920 is executed by the BS to enable the processor to transmit a systematized response message via the communication interface according to the systematized request message. Finally, step 921 is executed by the SS to enable the processor to receive a systematized response message via the communication interface after transmission of the systematized request message.

Figure 11C:
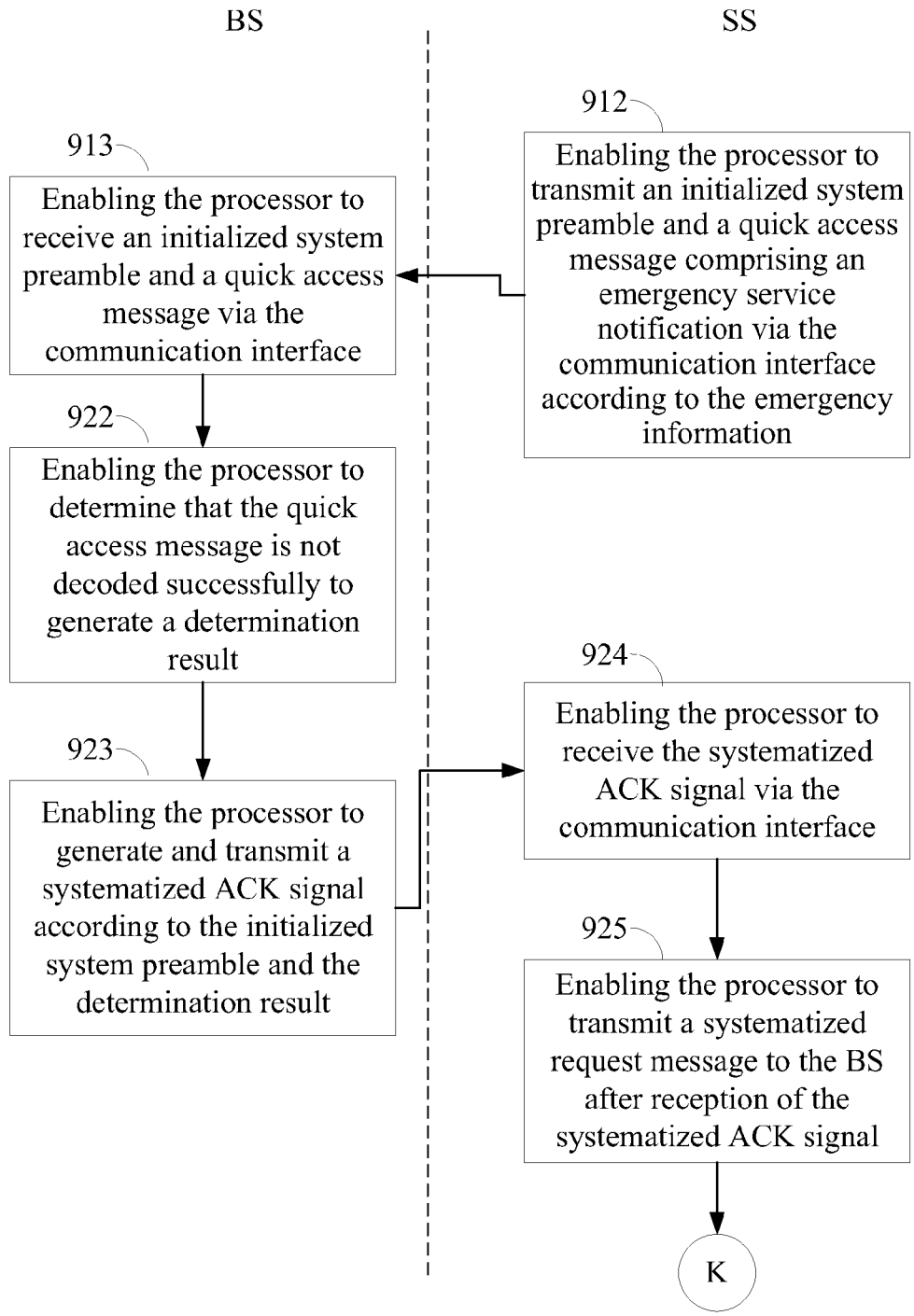
Figure 11D:
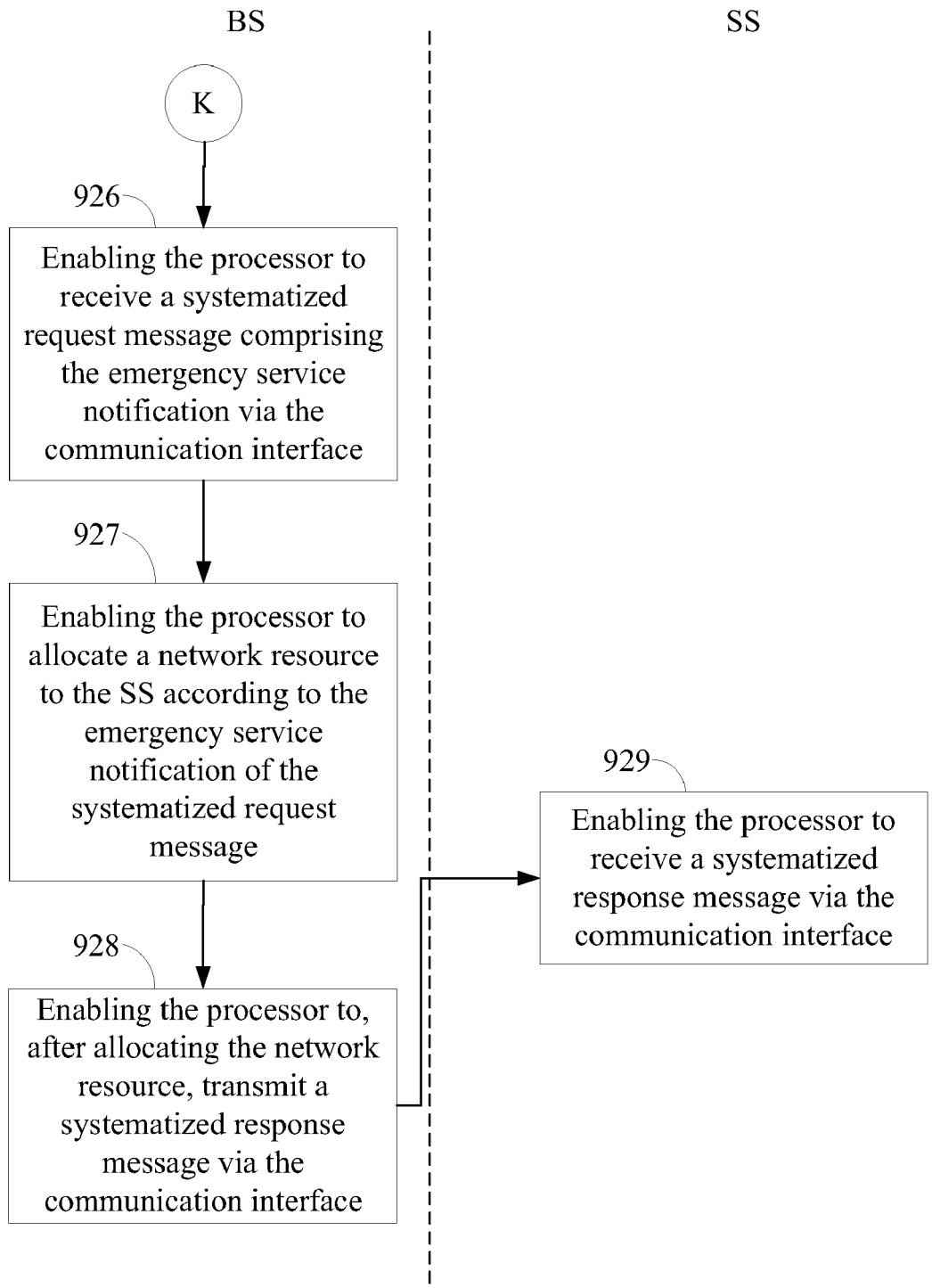

If the BS determines that the quick access message is not decoded successfully, then the SS may further accomplish the registration and the establishment of the emergency service flow simultaneously in the following way. Referring to FIG. 11C and FIG. 11D, step 809 comprises the following steps. Referring firstly to FIG. 11C, step 912 is executed by the SS to enable the processor to, after obtaining the emergency information, transmit an initialized system preamble and a quick access message comprising an emergency service notification to the BS via the communication interface according to the emergency information. Then, step 913 is executed by the BS to enable the processor to receive an initialized system preamble and a quick access message comprising an emergency service notification via the communication interface, and step 922 is executed by the BS to enable the processor to determine that the quick access message is not decoded successfully to generate a determination result. Afterwards, step 923 is executed by the BS to enable the processor to generate a systematized ACK signal according to the initialized system preamble and the determination result. Thereafter, step 924 is executed by the SS to enable the processor to receive the systematized ACK signal via the communication interface after transmission of the initialized system preamble and the quick access message, and step 925 is executed by the SS to enable the processor to transmit a systematized request message to the BS after reception of the systematized ACK signal.

Referring next to FIG. 11D, step 926 is executed by the BS to enable the processor to receive a systematized request message comprising the emergency service notification via the communication interface after transmission of the systematized ACK signal. Then, step 927 is executed by the BS to enable the processor to allocate a network resource to the SS according to the emergency service notification of the systematized request message, and step 928 is executed by the BS to enable the processor to, after allocating the network resource, transmit a systematized response message via the communication interface. Finally, step 929 is executed by the SS to enable the processor to receive a systematized response message via the communication interface after transmission of the systematized request message. It shall be appreciated that, the uplink agreement signal and a bandwidth request ACK signal may also be incorporated into a single signal for transmission to the SS, and the present invention has no limitation on this.

Figure 12:
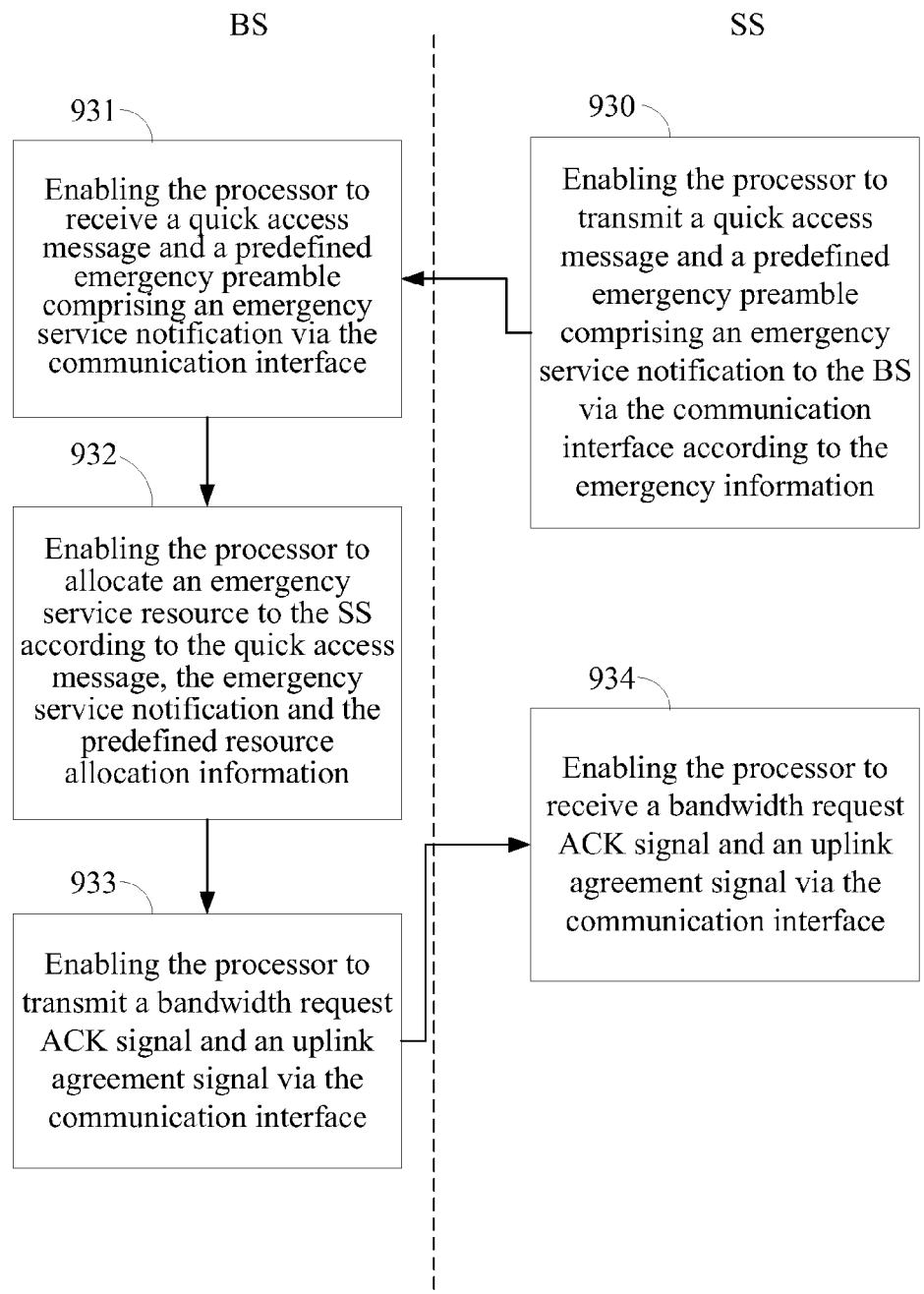

Next, how step 809 establishes an emergency service flow when the SS has been registered with the BS will be described. Referring to FIG. 12, step 809 comprises the following steps. Step 930 is executed by the SS to enable the processor to, after obtaining the emergency information, transmit a quick access message and a predefined emergency preamble comprising an emergency service notification to the BS via the communication interface according to the emergency information. Then, step 931 is executed by the BS to enable the processor to receive a quick access message and a predefined emergency preamble comprising an emergency service notification via the communication interface. Afterwards, step 932 is executed by the BS to enable the processor to allocate an emergency service resource to the SS according to the quick access message, the emergency service notification and the predefined resource allocation information, and step 933 is executed by the BS to enable the processor to, after allocating the emergency service resource, transmit a bandwidth request ACK signal and an uplink agreement signal via the communication interface. Finally, step 934 is executed by the SS to enable the processor to receive a bandwidth request ACK signal and an uplink agreement signal via the communication interface after transmission of the predefined emergency preamble and the quick access message.

Figure 13:
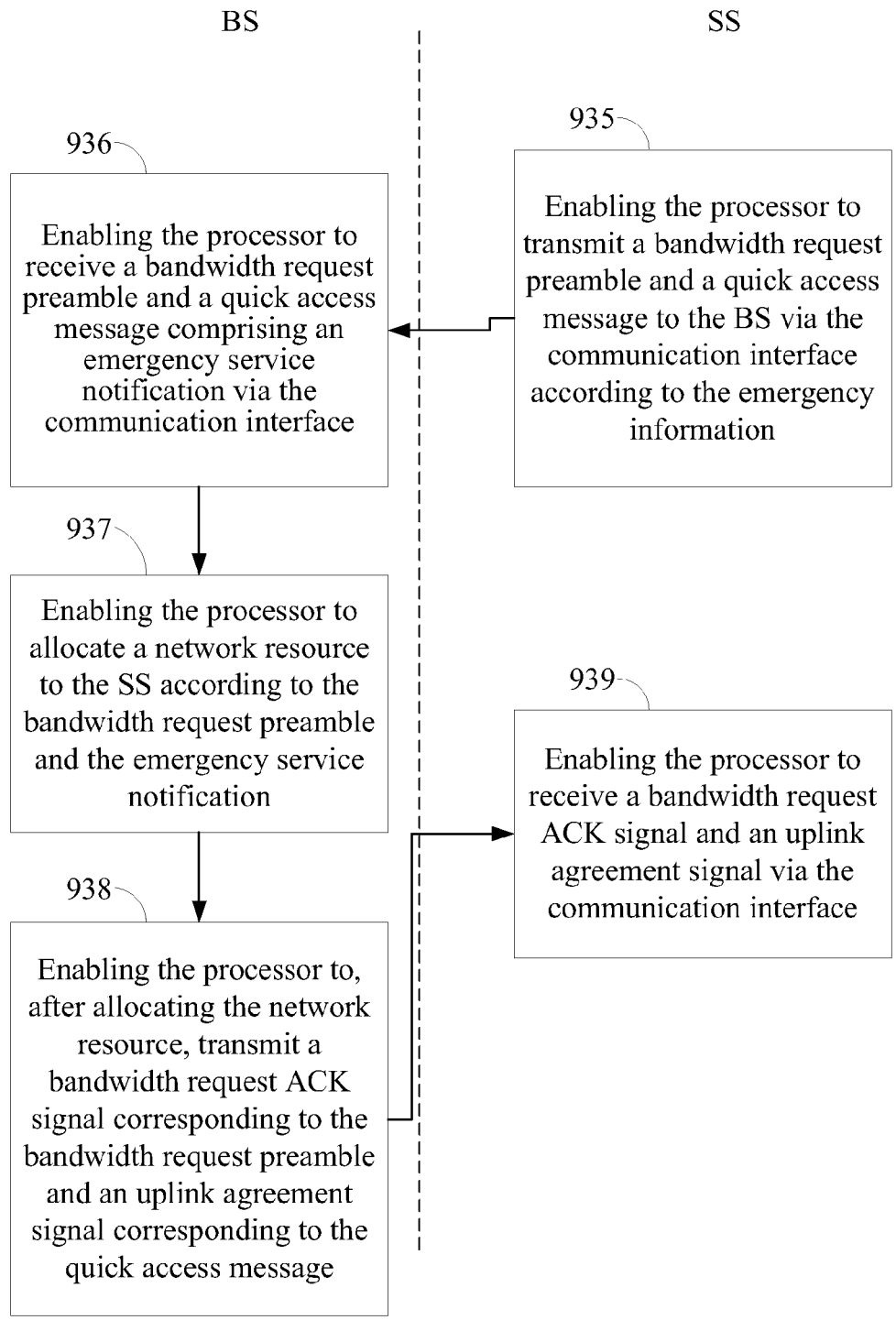

Next, another way to transmit emergency information and establish an emergency service flow when the SS has been registered with the BS will be described. Referring to FIG. 13, step 809 comprises the following steps. Step 935 is executed by the SS to enable the processor to, after obtaining the emergency information, transmit a bandwidth request preamble and a quick access message to the BS via the communication interface according to the emergency information. Then, step 936 is executed by the BS to enable the processor to receive a bandwidth request preamble and a quick access message comprising an emergency service notification via the communication interface. Afterwards, step 937 is executed by the BS to enable the processor to allocate a network resource to the SS according to the bandwidth request preamble and the emergency service notification, and step 938 is executed by the BS to enable the processor to, after allocating the network resource, transmit a bandwidth request ACK signal corresponding to the bandwidth request preamble and an uplink agreement signal corresponding to the quick access message. Finally, step 939 is executed by the SS to enable the processor to receive a bandwidth request ACK signal and an uplink agreement signal via the communication interface after transmission of the initialized system preamble and the quick access message. It shall be appreciated that, the uplink agreement signal and the bandwidth request ACK signal may also be incorporated into a single signal for transmission to the SS, and the present invention has no limitation on this.

According to the above descriptions, the present invention allocates an emergency alert indicator into a data section, which can not only be decoded by an SS that is in an active state, but can also be decoded by an SS that is in a power-saving state. By decoding the data section to obtain the emergency alert indicator, the SS can learn that there is emergency information it needs to receive, and then perform corresponding actions according to the emergency information. Thus, the present invention can effectively improve the utilization efficiency of network resources, thereby overcoming the shortcoming of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for transmitting emergency information, wherein the BS is adapted for use in a wireless network and is adapted to be used in conjunction with a backhaul network and a subordinate station (SS) that is in a power-saving state, and the backhaul network is configured to generate the emergency information, the BS comprising:
   a communication interface, being configured to receive the emergency information; and
   a processor, being electrically connected to the communication interface and configured to, in response to reception of the emergency information, generate an emergency alert indicator that indicates existence of the emergency information and allocate that the emergency information and the emergency alert indicator are to be transmitted via a broadcast/multicast channel;
   wherein the communication interface is further configured to transmit the emergency information and the emergency alert indicator via the broadcast/multicast channel so that the SS in the power-saving state can obtain the emergency information according to the emergency alert indicator, and the SS is further configured to perform corresponding actions in response to the emergency information.

2. The BS as claimed in claim 1, wherein the processor is configured to allocate the emergency alert indicator into a preamble of the broadcast/multicast channel and allocate the emergency information into a superframe header of the broadcast/multicast channel, the communication interface is further configured to transmit the preamble and the superframe header via the broadcast/multicast channel so that the SS in the power-saving state can, after receiving the preamble and the superframe header, decode the preamble to obtain the emergency alert indicator and further decode the superframe header according to the emergency alert indicator to obtain the emergency information, and the SS is further configured to perform corresponding actions in response to the emergency information.

3. The BS as claimed in claim 2, wherein the superframe header further comprises a first subpacket and a second subpacket, the processor is further configured to allocate the emergency alert indicator into the first subpacket and allocate the emergency information into the second subpacket, the communication interface is further configured to transmit the first subpacket and the second subpacket via the broadcast/multicast channel so that the SS in the power-saving state can, after receiving the first subpacket and the second subpacket, decode the first subpacket to obtain the emergency alert indicator and further decode the second subpacket according to the emergency alert indicator to obtain the emergency information, and the SS is further configured to perform corresponding actions in response to the emergency information.

4. The BS as claimed in claim 1, wherein the SS is in an available interval of the power-saving state, the broadcast/multicast channel further comprises a downlink MAP and an MAC management message, the processor is further configured to allocate the emergency alert indicator into the downlink MAP and allocate the emergency information into the MAC management message, the communication interface is further configured to transmit the downlink MAP and the MAC management message via the broadcast/multicast channel so that the SS in the available interval of the power-saving state can, after receiving the downlink MAP and the MAC management message, decode the downlink MAP to obtain the emergency alert indicator and further decode the MAC management message according to the emergency alert indicator to obtain the emergency information, and the SS is further configured to perform corresponding actions in response to the emergency information.

5. The BS as claimed in claim 3, wherein the broadcast/multicast channel further comprises an MAC management message, the processor is further configured to allocate the emergency information into the MAC management message, the communication interface is further configured to transmit the first subpacket and the MAC management message via the broadcast/multicast channel so that the SS can, after receiving the first subpacket and the MAC management message, decode the first subpacket to obtain the emergency alert indicator and further decode the MAC management message according to the emergency alert indicator to obtain the emergency information, and the SS is further configured to perform corresponding actions in response to the emergency information.

6. The BS as claimed in claim 1, wherein the SS is in an available interval of the power-saving state, the broadcast/multicast channel further comprises a broadcast/multicast service MAP and a broadcast/multicast service message (MBS message), the processor is further configured to allocate the emergency alert indicator into the broadcast/multicast service MAP and allocate the emergency information into the broadcast/multicast service message, the communication interface is further configured to transmit the broadcast/multicast service MAP and the broadcast/multicast service message via the broadcast/multicast channel so that the SS can, after receiving the broadcast/multicast service MAP and the broadcast/multicast service message, decode the broadcast/multicast service MAP to obtain the emergency alert indicator and further decode the broadcast/multicast service message according to the emergency alert indicator to obtain the emergency information, and the SS is further configured to perform corresponding actions in response to the emergency information.

7. The BS as claimed in claim 1, wherein the SS is in an available interval of the power-saving state, the processor is further configured to allocate the emergency alert indicator into a downlink MAP of a paging channel and allocate the emergency information into an indication message, the communication interface is further configured to transmit the downlink MAP and the indication message via the paging channel so that the SS can, after receiving the downlink MAP and the indication message, decode the downlink MAP to obtain the emergency alert indicator and further decode the indication message according to the emergency alert indicator to obtain the emergency information, and the SS is further configured to perform corresponding actions in response to the emergency information.

8. The BS as claimed in claim 7, wherein the processor is further configured to allocate the emergency information into a broadcast message of a broadcast channel, the communication interface is further configured to transmit the downlink MAP via the paging channel and transmit the emergency information via the broadcast message of the broadcast channel so that the SS can, after receiving the downlink MAP, decode the downlink MAP to obtain the emergency alert indicator, learn from the emergency alert indicator that it needs to receive the emergency information via the broadcast message of the broadcast channel, and further receive the emergency information from the broadcast message of the broadcast channel according to the emergency alert indicator, and the SS is further configured to perform corresponding actions in response to the emergency information.

9. The BS as claimed in claim 1, wherein the SS is in an available interval of the power-saving state, the processor is further configured to allocate the emergency alert indicator into an indication message of a downlink subframe of the available interval and allocate the emergency information into an MAC management message of the downlink subframe of the available interval, the communication interface is further configured to transmit the indication message and the MAC management message so that the SS can, after receiving the indication message, decode the indication message to obtain the emergency alert indicator and decode the MAC management message according to the emergency alert indicator to obtain the emergency information, and the SS is further configured to perform corresponding actions in response to the emergency information.

10. The BS as claimed in claim 1, wherein the SS is in an available interval of the power-saving state, the processor is further configured to allocate the emergency alert indicator into an indication message of a downlink subframe of the available interval and allocate the emergency information into an MAC management message of a downlink subframe of an unavailable interval, the communication interface is further configured to transmit the indication message so that the SS can, after receiving the indication message in the available interval, decode the indication message to obtain the emergency alert indicator, learn from the emergency alert indicator that it needs to receive the MAC management message in the unavailable interval, and, after receiving the MAC management message, decode the MAC management message to obtain the emergency information, and the SS is further configured to perform corresponding actions in response to the emergency information.

11. An emergency information transmission method for a BS, wherein the BS is adapted for use in a wireless network and is adapted to be used in conjunction with a backhaul network and an SS that is in a power-saving state, the backhaul network is configured to generate emergency information, and the BS comprises a communication interface and a processor electrically connected to the communication interface, the emergency information transmission method comprising the following steps of:
  (A) enabling the communication interface to receive the emergency information;
  (B) enabling the processor to, in response to reception of the emergency information, generate an emergency alert indicator that indicates existence of the emergency information;
  (C) enabling the processor to allocate that the emergency information and the emergency alert indicator are to be transmitted via a broadcast/multicast channel; and
  (D) enabling the communication interface to transmit the emergency information and the emergency alert indicator via the broadcast/multicast channel so that the SS in the power-saving state can obtain the emergency information according to the emergency alert indicator, and the SS is further configured to perform corresponding actions in response to the emergency information.

12. The emergency information transmission method as claimed in claim 11, wherein the step (C) comprises the following steps of:
  (C1) enabling the processor to allocate the emergency alert indicator into a preamble of a broadcast/multicast channel; and
  (C2) enabling the processor to allocate the emergency information into a superframe header of the broadcast/multicast channel;
  wherein the step (D) is a step of enabling the communication interface to transmit the preamble and the superframe header via the broadcast/multicast channel so that the SS in the power-saving state can, after receiving the preamble and the superframe header, decode the preamble to obtain the emergency alert indicator and further decode the superframe header according to the emergency alert indicator to obtain the emergency information, and the SS is further configured to perform corresponding actions in response to the emergency information.

13. The emergency information transmission method as claimed in claim 12, wherein the superframe header further comprises a first subpacket and a second subpacket, the step (C1) may be a step of enabling the processor to allocate the emergency alert indicator into the first subpacket, the step (C2) may be a step of enabling the processor to allocate the emergency information into the second subpacket, the step (D) is a step of enabling the communication interface to transmit the first subpacket and the second subpacket via the broadcast/multicast channel so that the SS in the power-saving state can, after receiving the first subpacket and the second subpacket, decode the first subpacket to obtain the emergency alert indicator and further decode the second subpacket according to the emergency alert indicator to obtain the emergency information, and the SS is further configured to perform corresponding actions in response to the emergency information.

14. The emergency information transmission method as claimed in claim 11, wherein the SS is in an available interval of the power-saving state, the broadcast/multicast channel further comprises a downlink MAP and an MAC management message, and the step (C) comprises the following steps of:
  (C1) enabling the processor to allocate the emergency alert indicator into the downlink MAP; and
  (C2) enabling the processor to allocate the emergency information into the MAC management message;
  wherein the step (D) is a step of enabling the communication interface to transmit the downlink MAP and the MAC management message via the broadcast/multicast channel so that the SS in the available interval of the power-saving state can, after receiving the downlink MAP and the MAC management message, decode the downlink MAP to obtain the emergency alert indicator and further decode the MAC management message according to the emergency alert indicator to obtain the emergency information, and the SS is further configured to perform corresponding actions in response to the emergency information.

15. The emergency information transmission method as claimed in claim 13, wherein the broadcast/multicast channel further comprises an MAC management message, the step (C2) may further be a step of enabling the processor to allocate the emergency information into the MAC management message, the step (D) may further be a step of enabling the communication interface to transmit the first subpacket and the MAC management message via the broadcast/multicast channel so that the SS can, after receiving the first subpacket and the MAC management message, decode the first subpacket to obtain the emergency alert indicator and further decode the MAC management message according to the emergency alert indicator to obtain the emergency information, and the SS is further configured to perform corresponding actions in response to the emergency information.

16. The emergency information transmission method as claimed in claim 11, wherein the SS is in an available interval of the power-saving state, the broadcast/multicast channel further comprises a broadcast/multicast service MAP and a broadcast/multicast service message, and the step (C) comprises the following steps of:
  (C1) enabling the processor to allocate the emergency alert indicator into the broadcast/multicast service MAP; and
  (C2) enabling the processor to allocate the emergency information into the broadcast/multicast service message;
  wherein the step (D) is a step of enabling the communication interface to transmit the broadcast/multicast service MAP and the broadcast/multicast service message via the broadcast/multicast channel so that the SS can, after receiving the broadcast/multicast service MAP and the broadcast/multicast service message, decode the broadcast/multicast service MAP to obtain the emergency alert indicator and further decode the broadcast/multicast service message according to the emergency alert indicator to obtain the emergency information, and the SS is further configured to perform corresponding actions in response to the emergency information.

17. The emergency information transmission method as claimed in claim 11, wherein the SS is in an available interval of the power-saving state, and the step (C) comprises the following steps of:
  (C1) enabling the processor to allocate the emergency alert indicator into a downlink MAP of a paging channel; and
  (C2) enabling the processor to allocate the emergency information into an indication message;
  wherein the step (D) is a step of enabling the communication interface to transmit the downlink MAP and the indication message via the paging channel so that the SS can, after receiving the downlink MAP and the indication message, decode the downlink MAP to obtain the emergency alert indicator and further decode the indication message according to the emergency alert indicator to obtain the emergency information, and the SS is further configured to perform corresponding actions in response to the emergency information.

18. The emergency information transmission method as claimed in claim 17, wherein the step (C2) may further be a step of enabling the processor to allocate the emergency information into a broadcast message of a broadcast channel, the step (D) may further be a step of enabling the communication interface to transmit the downlink MAP via the paging channel and transmit the emergency information via the broadcast message of the broadcast channel so that the SS can, after receiving the downlink MAP, decode the downlink MAP to obtain the emergency alert indicator, learn from the emergency alert indicator that it needs to receive the emergency information via the broadcast message of the broadcast channel, and further receive the emergency information via the broadcast message of the broadcast channel according to the emergency alert indicator, and the SS is further configured to perform corresponding actions in response to the emergency information.

19. The emergency information transmission method as claimed in claim 11, wherein the SS is in an available interval of the power-saving state, and the step (C) comprises the following steps of:
  (C1) enabling the processor to allocate the emergency alert indicator into an indication message of a downlink subframe of the available interval; and
  (C2) enabling the processor to allocate the emergency information into an MAC management message of the downlink subframe of the available interval;
  wherein the step (D) is a step of enabling the communication interface to transmit the indication message and the MAC management message so that the SS can, after receiving the indication message, decode the indication message to obtain the emergency alert indicator and decode the MAC management message according to the emergency alert indicator to obtain the emergency information, and the SS is further configured to perform corresponding actions in response to the emergency information.

20. The emergency information transmission method as claimed in claim 11, wherein the SS is in an available interval of the power-saving state, and the step (C) comprises the following steps of:
  (C1) enabling the processor to allocate the emergency alert indicator into an indication message of a downlink subframe of the available interval; and
  (C2) enabling the processor to allocate the emergency information into an MAC management message of a downlink subframe of an unavailable interval;
  wherein the step (D) is a step of enabling the communication interface to transmit the indication message so that the SS can, after receiving the indication message in the available interval, decode the indication message to obtain the emergency alert indicator, learn from the emergency alert indicator that it needs to receive the MAC management message in the unavailable interval, and, after receiving the MAC management message, decode the MAC management message to obtain the emergency information, and the SS is further configured to perform corresponding actions in response to the emergency information.

21. An SS for transmitting emergency information, wherein the SS is adapted to be used in conjunction with a BS of a wireless network, the BS is configured to transmit an emergency alert indicator and the emergency information via a broadcast/multicast channel, the emergency alert indicator is configured to indicate existence of the emergency information, and the SS is in a power-saving state and comprises:
  a communication interface, being configured to receive the emergency alert indicator and the emergency information via the broadcast/multicast channel in the power-saving state; and
  a processor, being electrically connected to the communication interface and configured to:
    learn about existence of the emergency information from the emergency alert indicator; and
    according to the emergency information, execute a handshake protocol with the BS via the communication interface to establish an emergency service flow.

22. The SS as claimed in claim 21, wherein the BS is configured to transmit a preamble and a superframe header of the broadcast/multicast channel via the broadcast/multicast channel, the preamble comprises the emergency alert indicator, the superframe header comprises the emergency information, the communication interface is further configured to receive the preamble and the superframe header via the broadcast/multicast channel in the power-saving state, and the processor is further configured to:
- decode the preamble to obtain the emergency alert indicator, and learn from the emergency alert indicator that it needs to decode the superframe header;
- decode the superframe header to obtain the emergency information; and
- according to the emergency information, execute the handshake protocol with the BS via the communication interface to establish the emergency service flow.

23. The SS as claimed in claim 22, wherein the superframe header further comprises a first subpacket and a second subpacket, the first subpacket comprises the emergency alert indicator, the second subpacket comprises the emergency information, the communication interface is further configured to receive the first subpacket and the second subpacket via the broadcast/multicast channel in the power-saving state, and the processor is further configured to:
- decode the first subpacket to obtain the emergency alert indicator, and learn from the emergency alert indicator that it needs to decode the second subpacket;
- decode the second subpacket to obtain the emergency information; and
- according to the emergency information, execute the handshake protocol with the BS via the communication interface to establish the emergency service flow.

24. The SS as claimed in claim 22, wherein the broadcast/multicast channel further comprises a downlink MAP and an MAC management message, the downlink MAP comprises the emergency alert indicator, the MAC management message comprises the emergency information, the SS is in an available interval of the power-saving state, the communication interface is further configured to receive the downlink MAP and the MAC management message via the broadcast/multicast channel in the available interval of the power-saving state, and the processor is further configured to:
- decode the downlink MAP to obtain the emergency alert indicator, and learn from the emergency alert indicator that it needs to decode the MAC management message;
- decode the MAC management message to obtain the emergency information; and
- according to the emergency information, execute the handshake protocol with the BS via the communication interface to establish the emergency service flow.

25. The SS as claimed in claim 23, wherein the broadcast/multicast channel further comprises an MAC management message, the MAC management message comprises the emergency information, the communication interface is further configured to receive the first subpacket and the MAC management message via the broadcast/multicast channel in the power-saving state, and the processor is further configured to:
- decode the first subpacket to obtain the emergency alert indicator, and learn from the emergency alert indicator that it needs to decode the MAC management message;
- decode the MAC management message to obtain the emergency information; and
- according to the emergency information, execute the handshake protocol with the BS via the communication interface to establish the emergency service flow.

26. The SS as claimed in claim 22, wherein the broadcast/multicast channel further comprises a broadcast/multicast service MAP and a broadcast/multicast service message, the broadcast/multicast service MAP comprises the emergency alert indicator, the broadcast/multicast service message comprises the emergency information, the SS is in an available interval of the power-saving state, the communication interface is further configured to receive the broadcast/multicast service MAP and the broadcast/multicast service message via the broadcast/multicast channel in the available interval of the power-saving state, and the processor is further configured to:
- decode the broadcast/multicast service MAP to obtain the emergency alert indicator, and learn from the emergency alert indicator that it needs to decode the broadcast/multicast service message;
- decode the broadcast/multicast service message to obtain the emergency information; and
- according to the emergency information, execute the handshake protocol with the BS via the communication interface to establish the emergency service flow.

27. The SS as claimed in claim 22, wherein the BS is further configured to transmit a downlink MAP and an indication message of a paging channel via the paging channel, the downlink MAP comprises the emergency alert indicator, the indication message comprises the emergency information, the SS is in an available interval of the power-saving state, the communication interface is further configured to receive the downlink MAP and the indication message via the paging channel in the available interval of the power-saving state, and the processor is further configured to:
- decode the downlink MAP to obtain the emergency alert indicator, and learn from the emergency alert indicator that it needs to decode the indication message;
- decode the indication message to obtain the emergency information; and
- according to the emergency information, execute the handshake protocol with the BS via the communication interface to establish the emergency service flow.

28. The SS as claimed in claim 27, wherein the BS is further configured to transmit the downlink MAP via the paging channel and transmit the emergency information via a broadcast message of a broadcast channel, and the communication interface is further configured to receive the downlink MAP via the paging channel and receive the emergency information via the broadcast message of the broadcast channel.

29. The SS as claimed in claim 22, wherein the SS is in an available interval of the power-saving state, the BS is further configured to transmit an indication message of a downlink subframe of the available interval and transmit an MAC management message of the downlink subframe of the available interval, the indication message comprises the emergency alert indicator, the MAC management message comprises the emergency information, the communication interface is further configured to receive the indication message and the MAC management message in the available interval of the power-saving state, and the processor is further configured to: decode the indication message to obtain the emergency alert indicator; decode the MAC management message according to the emergency alert indicator to obtain the emergency information; and according to the emergency information, execute the handshake protocol with the BS via the communication interface to establish the emergency service flow.

30. The SS as claimed in claim 22, wherein the SS is in an available interval of the power-saving state, the BS is further configured to transmit an indication message of a downlink subframe of the available interval and transmit an MAC management message of a downlink subframe of an unavailable interval, the indication message comprises the emergency alert indicator, the MAC management message comprises the emergency information, the communication interface is further configured to receive the indication message in the available interval of the power-saving state, the processor is further configured to decode the indication message to obtain the emergency alert indicator, and learn from the emergency alert indicator that it needs to receive the MAC management message in the unavailable interval, the communication interface is further configured to receive the MAC management message in the unavailable interval, and the processor is further configured to decode the MAC management message to obtain the emergency information and, according to the emergency information, execute the handshake protocol with the BS via the communication interface to establish the emergency service flow.

31. An emergency information transmission method for an SS, wherein the SS is adapted to be used in conjunction with a BS of a wireless network, the BS is configured to transmit an emergency alert indicator and the emergency information via a broadcast/multicast channel, the emergency alert indicator is configured to indicate existence of the emergency information, and the SS is in a power-saving state and comprises a communication interface and a processor electrically connected to the communication interface, the emergency information transmission method comprising the following steps of:
  (A) enabling the communication interface to receive the emergency alert indicator and the emergency information via the broadcast/multicast channel in the power-saving state;
  (B) enabling the processor to learn about existence of the emergency information from the emergency alert indicator; and
  (C) enabling the processor to, according to the emergency information, execute a handshake protocol with the BS via the communication interface to establish an emergency service flow.

32. The emergency information transmission method as claimed in claim 31, wherein the BS is configured to transmit a preamble and a superframe header of the broadcast/multicast channel via the broadcast/multicast channel, the preamble comprises the emergency alert indicator, the superframe header comprises the emergency information, the step (A) is a step of enabling the communication interface to receive the preamble and the superframe header via the broadcast/multicast channel in the power-saving state, and the step (B) comprises the following steps of:
  (B1) enabling the processor to decode the preamble to obtain the emergency alert indicator, and learn from the emergency alert indicator that it needs to decode the superframe header; and
  (B2) enabling the processor to decode the superframe header to obtain the emergency information.

33. The emergency information transmission method as claimed in claim 32, wherein the superframe header further comprises a first subpacket and a second subpacket, the first subpacket comprises the emergency alert indicator, the second subpacket comprises the emergency information, the step (A) may further be a step of enabling the communication interface to receive the first subpacket and the second subpacket via the broadcast/multicast channel in the power-saving state, the step (B1) is a step of enabling the processor to decode the first subpacket to obtain the emergency alert indicator, and learn from the emergency alert indicator that it needs to decode the second subpacket, and the step (B2) is a step of enabling the processor to decode the second subpacket to obtain the emergency information.

34. The emergency information transmission method as claimed in claim 32, wherein the broadcast/multicast channel further comprises a downlink MAP and an MAC management message, the downlink MAP comprises the emergency alert indicator, the MAC management message comprises the emergency information, the SS is in an available interval of the power-saving state, the step (A) may further be a step of enabling the communication interface to receive the downlink MAP and the MAC management message via the broadcast/multicast channel in the available interval of the power-saving state, the step (B1) is a step of enabling the processor to decode the downlink MAP to obtain the emergency alert indicator, and learn from the emergency alert indicator that it needs to decode the MAC management message, and the step (B2) is a step of enabling the processor to decode the MAC management message to obtain the emergency information.

35. The emergency information transmission method as claimed in claim 33, wherein the broadcast/multicast channel further comprises an MAC management message, the MAC management message comprises the emergency information, the step (A) may further be a step of enabling the communication interface to receive the first subpacket and the MAC management message via the broadcast/multicast channel in the power-saving state, the step (B1) may further be a step of enabling the processor to decode the first subpacket to obtain the emergency alert indicator, and learn from the emergency alert indicator that it needs to decode the MAC management message, and the step (B2) is a step of enabling the processor to decode the MAC management message to obtain the emergency information.

36. The emergency information transmission method as claimed in claim 32, wherein the broadcast/multicast channel further comprises a broadcast/multicast service MAP and a broadcast/multicast service message, the broadcast/multicast service MAP comprises the emergency alert indicator, the broadcast/multicast service message comprises the emergency information, the SS is in an available interval of the power-saving state, the step (A) may further be a step of enabling the communication interface to receive the broadcast/multicast service MAP and the broadcast/multicast service message via the broadcast/multicast channel in the available interval of the power-saving state, the step (B1) is a step of enabling the processor to decode the broadcast/multicast service MAP to obtain the emergency alert indicator, and learn from the emergency alert indicator that it needs to decode the broadcast/multicast service message, and the step (B2) is a step of enabling the processor to decode the broadcast/multicast service message to obtain the emergency information.

37. The emergency information transmission method as claimed in claim 32, wherein the BS is further configured to transmit a downlink MAP and an indication message of a paging channel via the paging channel, the downlink MAP comprises the emergency alert indicator, the indication message comprises the emergency information, the SS is in an available interval of the power-saving state, the step (A) may further be a step of enabling the communication interface to receive the downlink MAP and the indication message via the paging channel in the available interval of the power-saving state, the step (B1) is a step of enabling the processor to decode the downlink MAP to obtain the emergency alert indicator, and learn from the emergency alert indicator that it needs to decode the indication message, and the step (B2) is a step of enabling the processor to decode the indication message to obtain the emergency information.

38. The emergency information transmission method as claimed in claim 37, wherein the BS is further configured to transmit the downlink MAP via the paging channel and transmit the emergency information via a broadcast message of a broadcast channel, the step (A) comprises a step of enabling the communication interface to receive the downlink MAP via the paging channel and a step of enabling the communication interface to receive the broadcast message via the broadcast channel, the step (B1) is a step of enabling the processor to decode the downlink MAP to obtain the emergency alert indicator and learn from the emergency alert indicator that it needs to decode the broadcast message, the step (B2) is a step of enabling the processor to decode the broadcast message to obtain the emergency information.

39. The emergency information transmission method as claimed in claim 32, wherein the SS is in an available interval of the power-saving state, the BS is further configured to transmit an indication message of a downlink subframe of the available interval and transmit an MAC management message of the downlink subframe of the available interval, the indication message comprises the emergency alert indicator, the MAC management message comprises the emergency information, the step (A) may further be a step of enabling the communication interface to receive the indication message and the MAC management message in the available interval of the power-saving state, the step (B1) may further be a step of enabling the processor to decode the indication message to obtain the emergency alert indicator, the step (B2) may further be a step of enabling the processor to decode the MAC management message according to the emergency alert indicator to obtain the emergency information.

40. The emergency information transmission method as claimed in claim 32, wherein the SS is in an available interval of the power-saving state, the BS is further configured to transmit an indication message of a downlink subframe of the available interval and transmit an MAC management message of a downlink subframe of an unavailable interval, the indication message comprises the emergency alert indicator, the MAC management message comprises the emergency information, and the emergency information transmission method further comprises the following steps of:

enabling the communication interface to receive the indication message in the available interval of the power-saving state;

enabling the processor to decode the indication message to obtain the emergency alert indicator, and learn from the emergency alert indicator that it needs to receive the MAC management message in the unavailable interval;

enabling the communication interface to receive the MAC management message in the unavailable interval;

enabling the processor to decode the MAC management message to obtain the emergency information; and enabling the processor to, according to the emergency information, execute the handshake protocol with the BS via the communication interface to establish the emergency service flow.

\* \* \* \* \*